(12) United States Patent
Kataoka

(10) Patent No.: US 11,994,266 B2
(45) Date of Patent: May 28, 2024

(54) LIGHT DISTRIBUTION CONTROL DEVICE, VEHICULAR LAMP SYSTEM, AND LIGHT DISTRIBUTION CONTROL METHOD

(71) Applicant: KOITO MANUFACTURING CO., LTD., Tokyo (JP)

(72) Inventor: Takuya Kataoka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/060,740

(22) Filed: Dec. 1, 2022

(65) Prior Publication Data

US 2023/0088603 A1  Mar. 23, 2023

Related U.S. Application Data

(63) Continuation of application No. PCT/JP2021/021721, filed on Jun. 8, 2021.

(30) Foreign Application Priority Data

Jun. 9, 2020 (JP) ................................. 2020-100376
Dec. 15, 2020 (JP) ................................. 2020-207613

(51) Int. Cl.
*F21S 41/663* (2018.01)
*F21S 41/40* (2018.01)

(52) U.S. Cl.
CPC .............. *F21S 41/663* (2018.01); *F21S 41/40* (2018.01)

(58) Field of Classification Search
CPC ................................. F21S 41/663; F21S 41/40
See application file for complete search history.

(56) References Cited

U.S. PATENT DOCUMENTS

2008/0144326 A1  6/2008  Watanabe
2015/0048736 A1  2/2015  Foltin
2018/0215307 A1  8/2018  Neitzke
(Continued)

FOREIGN PATENT DOCUMENTS

EP   2567867 A2   3/2013
JP   2016088224 A  5/2016
JP   2020023227 A  2/2020

OTHER PUBLICATIONS

International Search Report (PCT/ISA/210) with translation dated Aug. 17, 2021, by the Japanese Patent Office as the International Searching Authority for International Application No. PCT/JP2021/021721. (5 pages).
(Continued)

*Primary Examiner* — Christopher E Dunay
(74) *Attorney, Agent, or Firm* — BUCHANAN INGERSOLL & ROONEY PC

(57) ABSTRACT

A light distribution control device controls a variable light distribution lamp based on images repeatedly obtained from an imaging device. The light distribution control device controls the variable light distribution lamp to form a light distribution pattern determined by a plurality of items of first light distribution pattern information based on the respective images, the first light distribution pattern information including, when the image includes a predetermined light spot, a light shielding part determined based on the light spot and not including a light shielding part when the image does not include a light spot.

14 Claims, 13 Drawing Sheets

(56) References Cited

U.S. PATENT DOCUMENTS

| | | | |
|---|---|---|---|
| 2019/0225139 A1* | 7/2019 | Kambara | B60Q 1/143 |
| 2019/0359122 A1* | 11/2019 | Hosoyama | F21S 41/683 |
| 2020/0032976 A1* | 1/2020 | Shimada | B60Q 1/0023 |
| 2020/0039419 A1 | 2/2020 | Kitazawa | |
| 2020/0039420 A1 | 2/2020 | Kitazawa | |
| 2020/0088374 A1* | 3/2020 | Kogure | F21S 41/265 |
| 2020/0196407 A1* | 6/2020 | Takeyasu | B60Q 1/08 |
| 2020/0282897 A1* | 9/2020 | Muramatsu | B60Q 1/0023 |
| 2023/0096367 A1* | 3/2023 | Mano | H05B 47/155 |
| | | | 362/543 |

OTHER PUBLICATIONS

International Preliminary Report on Patentability Chapter I (PCT/IB/373) and Written Opinion (PCT/ISA/237) dated Dec. 13, 2022 by The International Bureau of WIPO in corresponding International Patent Application No. PCT/JP2021/021721. (8 pages).
Extended European Search Report dated Oct. 24, 2023, issued in corresponding European Application No. 21823129.8. (9 pages).

\* cited by examiner

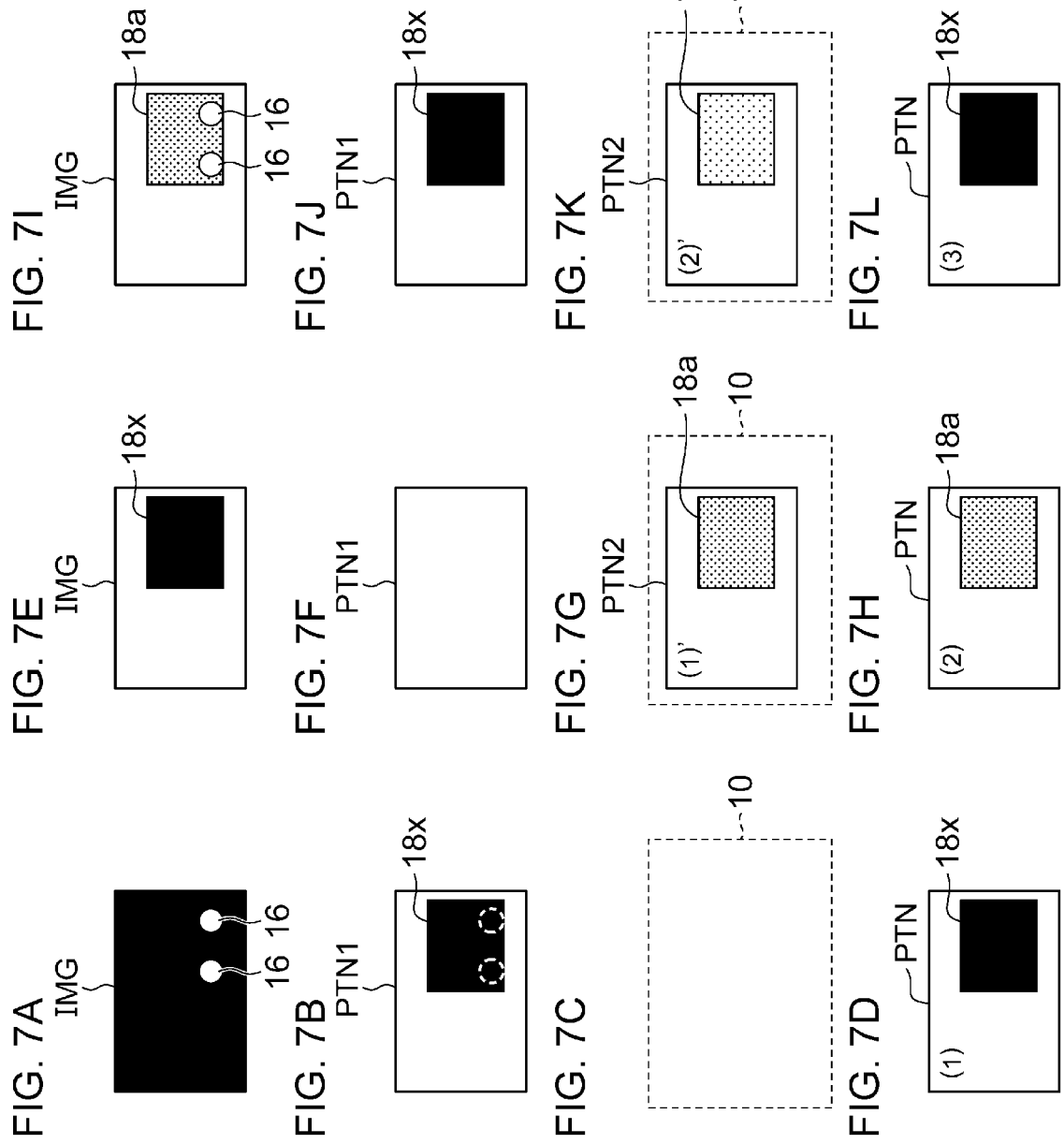

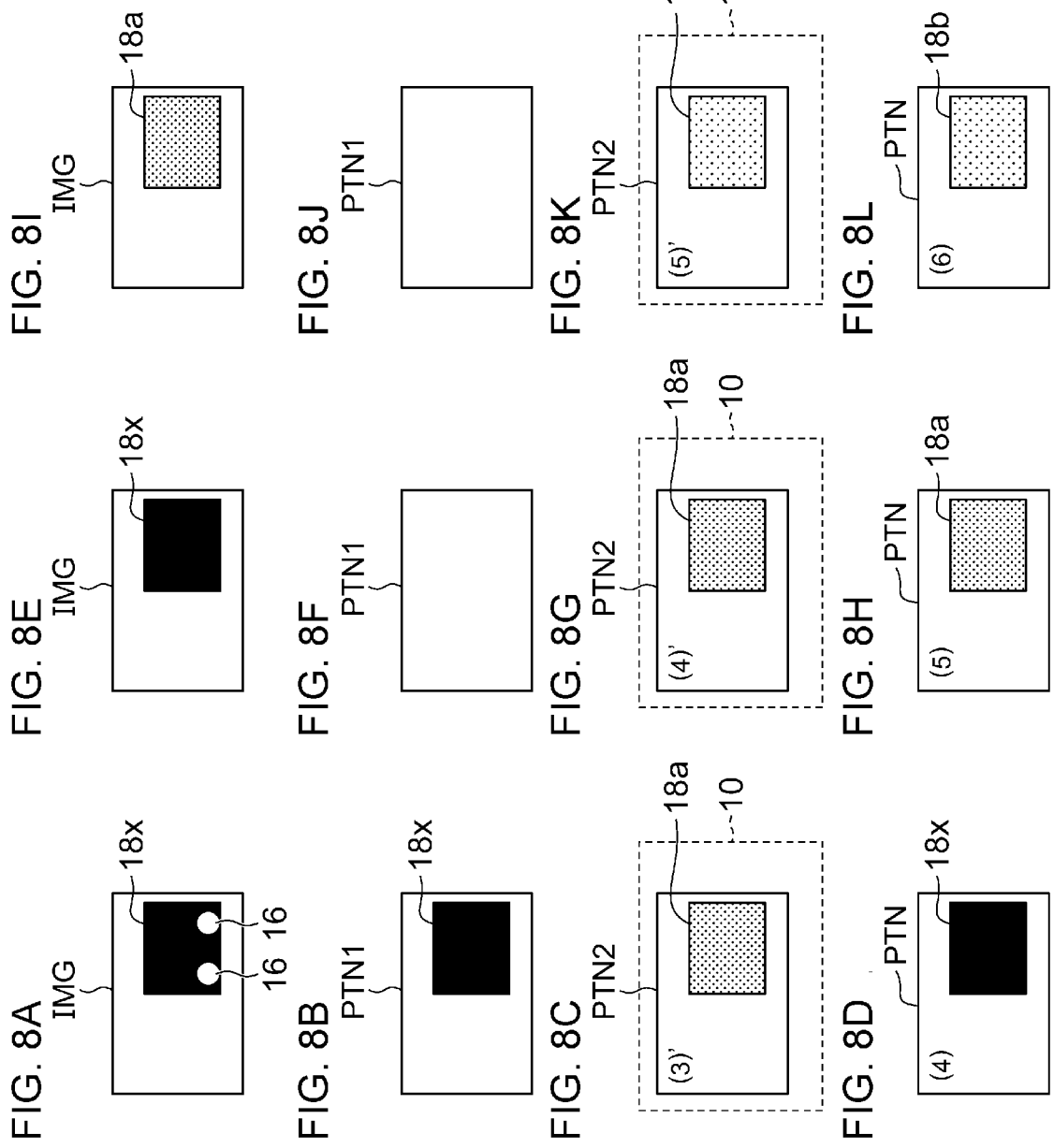

FIG. 9A
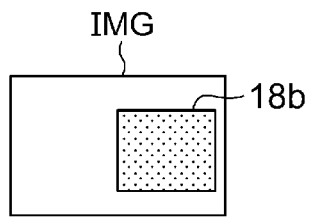
FIG. 9E
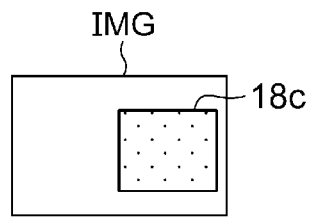
FIG. 9B
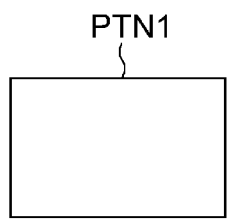
FIG. 9F
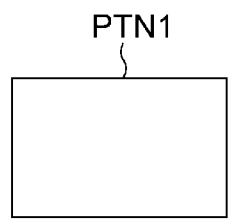
FIG. 9C
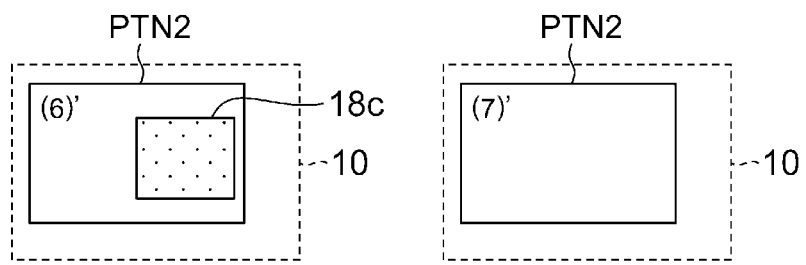
FIG. 9G
FIG. 9D
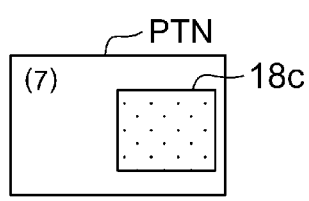
FIG. 9H
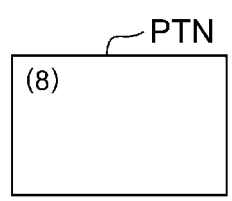

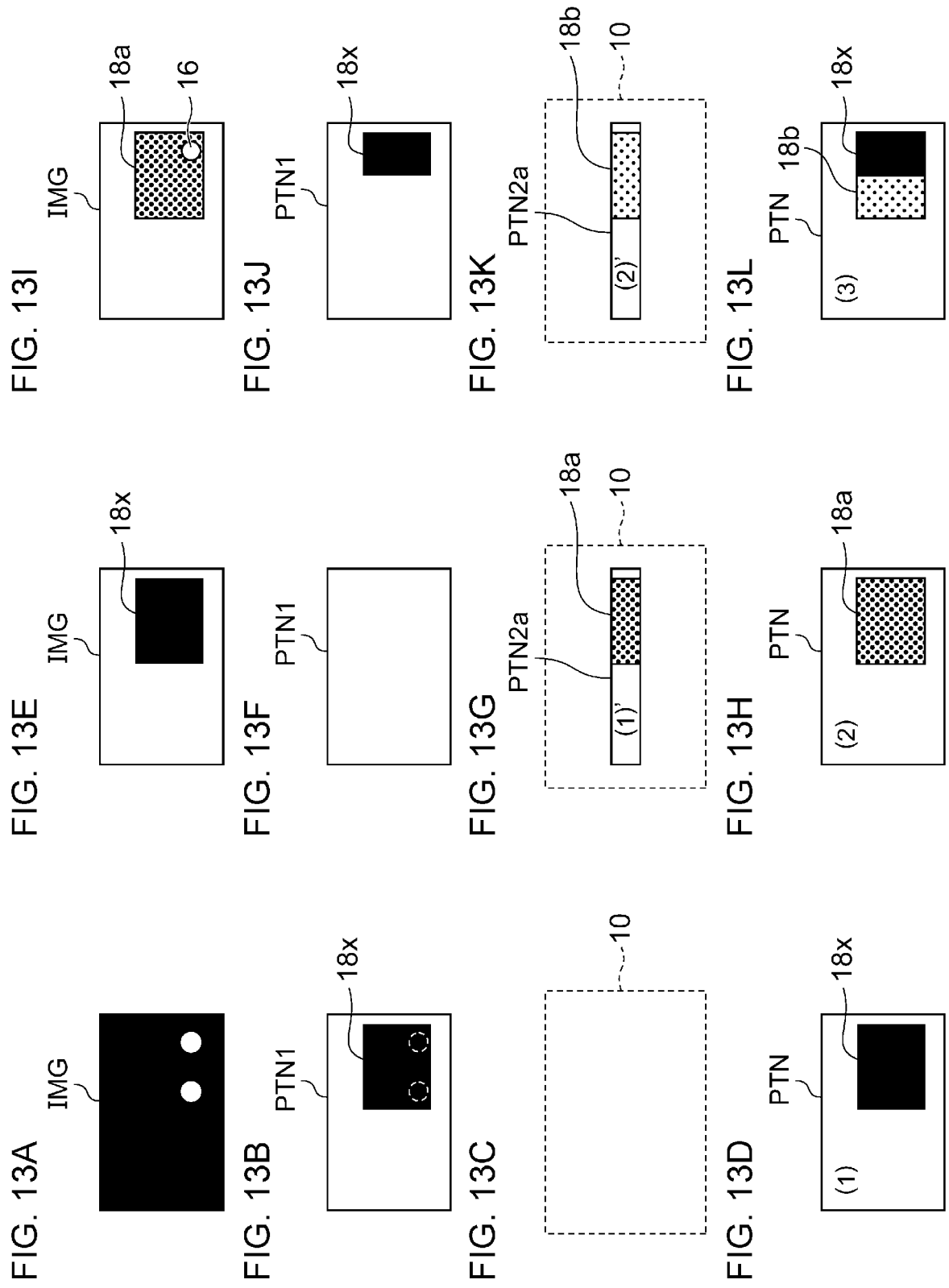

LIGHT DISTRIBUTION CONTROL DEVICE, VEHICULAR LAMP SYSTEM, AND LIGHT DISTRIBUTION CONTROL METHOD

CROSS-REFERENCE TO RELATED APPLICATIONS

This application is based upon and claims the benefit of priority from the prior Japanese Patent Application No. 2020-100376, filed on Jun. 9, 2020, the prior Japanese Patent Application No. 2020-207613, filed on Dec. 15, 2020, and International Patent Application No. PCT/JP2021/021721, filed on Jun. 8, 2021, the entire content of each of which is incorporated herein by reference.

BACKGROUND

Field of the Invention

The present invention relates to a light distribution control device, a vehicular lamp system, and a light distribution control method.

Description of the Related Art

Recently, adaptive driving beam (ADB) control for controlling a light distribution pattern dynamically and adaptively based on the condition around a vehicle is proposed. ADB control is configured to detect an object subject to light shielding which is located in front of the driver's vehicle and for which high-intensity light irradiation should be avoided and to shield an area corresponding to the object subject to light shielding from light (see, for example, patent literature 1). An object subject to light shielding is exemplified by a vehicle in front such as a leading vehicle and an oncoming vehicle. By shielding an area corresponding to the vehicle in front, it is possible to improve visibility for the driver of the driver's vehicle, while also avoiding glare experienced by the driver of the vehicle in front.
Patent literature 1: JP2016-088224

One conceivable method to detect a vehicle in front subject to light shielding is to detect the vehicle based on a light spot included in an image generated by a camera and originating from the lamp of the vehicle in front. We have actively studied ADB control in which camera-based detection of a vehicle in front is incorporated and have found out that the visibility for the drive could be lowered according to the related-art method.

In other words, an instance in which the brightness or color of a light spot exceeds a threshold value could frequently switch to an instance in which it falls below the threshold value in repeatedly obtained images, provided that the brightness or color of the lamp is near the detection threshold value. In another possible scenario, an instance in which a light spot is captured in an image could frequently switch, depending on the timing of camera imaging, to an instance in which it is not, provided that the lamp light is modulated by pulse width modulation (PWM) and the lamp flashes at a high speed. When such a situation occurs, momentary switching between formation and non-formation of a light shielding part is repeated with the result that the driver of the driver's vehicle feels uncomfortable and the visibility could drop.

SUMMARY OF THE INVENTION

The present invention addresses the above-described issues, and a purpose thereof is to provide a technology of suppressing a drop in the visibility for the driver.

An embodiment of the present invention relates to a light distribution control device adapted to control, based on images repeatedly obtained from an imaging device that images an area in front of a vehicle, a variable light distribution lamp capable of radiating a variable intensity distribution visible light beam to the area in front. The device controls the variable light distribution lamp to form a light distribution pattern determined by a plurality of items of first light distribution pattern information based on the respective images, the first light distribution pattern information including, when the image includes a predetermined light spot, a light shielding part determined based on the light spot and not including a light shielding part when the image does not include a light spot.

Another embodiment of the present invention relates to a vehicular lamp system. The system includes a variable light distribution lamp capable of radiating a variable intensity distribution visible light beam to an area in front of a vehicle; an imaging device that images the area in front; and the light distribution control device according to the above embodiment.

Another embodiment of the present invention relates to a light distribution control method adapted to control, based on images repeatedly obtained from an imaging device that images an area in front of a vehicle, a variable light distribution lamp capable of radiating a variable intensity distribution visible light beam to the area in front. The method includes controlling the variable light distribution lamp to form a light distribution pattern determined by a plurality of items of first light distribution pattern information based on the respective images, the first light distribution pattern information including, when the image includes a predetermined light spot, a light shielding part determined based on the light spot and not including a light shielding part when the image does not include a light spot.

Optional combinations of the aforementioned constituting elements, and replacement of implementation of the present invention in the form of methods, devices, systems, etc. may also be practiced as optional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A-7L are schematic diagrams showing the flow of control executed by the light distribution control device;

FIGS. 8A-8L are schematic diagrams showing the flow of control executed by the light distribution control device;

FIGS. 9A-9H are schematic diagrams showing the flow of control executed by the light distribution control device;

FIGS. 13A-13L are schematic diagrams showing the flow of control executed by the light distribution control device in the vehicular lamp system according to variation 3.

DETAILED DESCRIPTION OF THE INVENTION

Figure 1:
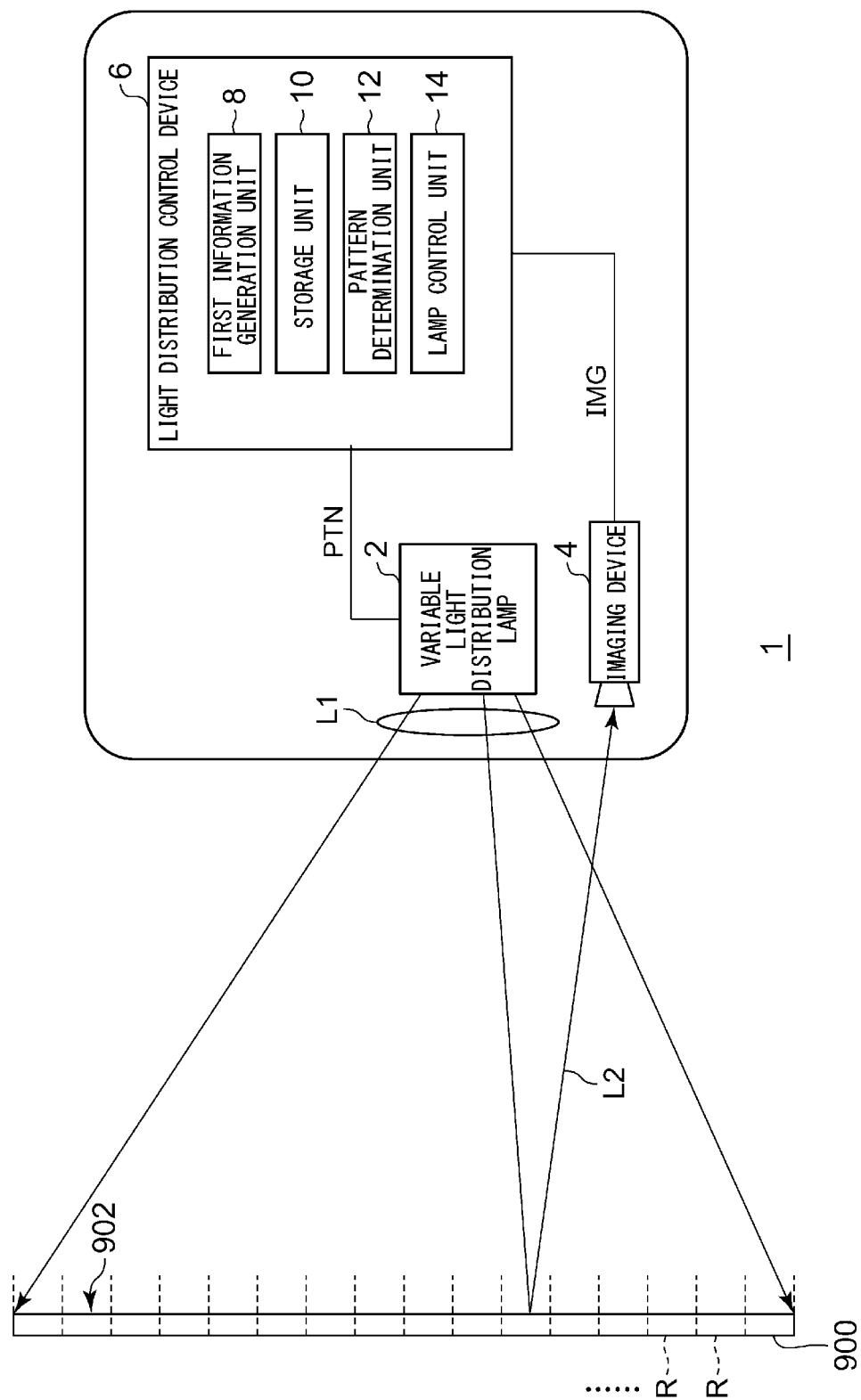
FIG. 1 is a block diagram of a vehicular lamp system according to embodiment 1.

Hereinafter, the present invention will be described based on preferred embodiments with reference to the accompanying drawings. The embodiments do not intend to limit the scope of the invention but exemplify the invention. Not all of the features and the combinations thereof described in the embodiments are necessarily essential to the invention. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless specified otherwise and are used to distinguish a certain feature from the others. Those of the members that are not important in describing the embodiment are omitted from the drawings.

Embodiment 1

FIG. 1 is a block diagram of a vehicular lamp system according to embodiment 1. FIG. 1 depicts some of the elements constituting a vehicular lamp system 1 as functional blocks. These functional blocks are implemented in hardware by a device or a circuit such as a CPU and a memory of a computer, and in software by a computer program, etc. It will be understood by those skilled in the art that the functional block may be implemented in a variety of manners by a combination of hardware and software.

The vehicular lamp system 1 includes a variable light distribution lamp 2, an imaging device 4, and a light distribution control device 6. These members may be built in the same housing. Alternatively, some of the members may be provided outside the housing, i.e., on the vehicle side.

The variable light distribution lamp 2 is a lamp capable of radiating a variable intensity distribution visible light beam L1 to an area in front of a vehicle. The variable light distribution lamp 2 is configured such that the illuminance of light irradiating a plurality of individual areas R arranged in the area in front can be modified individually. The plurality of individual areas R are arranged in, for example, a matrix. The variable light distribution lamp 2 receives data designating a light distribution pattern PTN from the light distribution control device 6 and outputs the visible light beam L1 having an intensity distribution determined by the light distribution pattern PTN. This forms the light distribution pattern PTN in front of the driver's vehicle. The light distribution pattern PTN is understood to be a two-dimensional illuminance distribution of an irradiation pattern 902 that the variable light distribution lamp 2 forms on a vertical virtual screen 900 in front of the driver's vehicle. The time required for the variable light distribution lamp 2 to form one light distribution pattern PTN is, for example, about 0.1-5 ms.

The embodiment is non-limiting as to the configuration of the variable light distribution lamp 2. For example, the variable light distribution lamp 2 includes a plurality of light sources arranged in a matrix and a lighting circuit that drives the light sources individually to light the light source(s). Preferable examples of the light source include semiconductor light sources such as a light emitting device (LED), a laser diode (LD), and an organic or inorganic electroluminescence (EL) device. Each individual area R and each light source are associated with each other, and each individual area R is individually irradiated with light from the respective light sources. For formation of an illuminance distribution determined by the light distribution pattern PTN, the variable light distribution lamp 2 may include a pattern formation device of matrix type such as a digital mirror device (DMD) and a liquid crystal device or include a pattern formation device of optical scan type configured to scan an area in front of the driver's vehicle with a light from a light source.

The imaging device 4 has sensitivity in the visible light zone and images an area in front of the vehicle. The imaging device 4 captures a reflected light L2 from an object in front of the vehicle reflecting the visible light beam L1. The imaging device 4 may have sensitivity at least in the wavelength band of the visible light beam L1. The image IMG generated by the imaging device 4 is sent to the light distribution control device 6. The frame rate of the imaging device 4 is, for example, 200 fps-10000 fps (0.1-5 ms per one frame).

The light distribution control device 6 executes ADB control for controlling light radiation from the variable light distribution lamp 2 based on the image IMG repeatedly obtained from the imaging device 4 to control the light distribution pattern PTN dynamically and adaptively. The light distribution control device 6 may be comprised of a digital processor. For example, the light distribution control device 6 may be comprised of a combination of a microcomputer, including a CPU, and a software program. The light distribution control device 6 may alternatively be comprised of a field programmable gate array (FPGA), an application specified IC (ASIC), or the like.

The light distribution control device 6 controls the variable light distribution lamp 2 to generate the light distribution pattern PTN determined by a plurality of items of first light distribution pattern information PTN1 based on the respective images IMG, the first light distribution pattern information PTN1 including, when the image IMG includes a predetermined light spot 16, a light shielding part 18 determined based on the light spot 16 and not including a light shielding part 18 when the image IMG does not include the light spot 16. By way of one example, the light distribution control device 6 includes a first information generation unit 8, a storage unit 10, a pattern determination unit 12, and a lamp control unit 14. For operation of each part, the integrate circuit forming the part runs a program stored in a memory. The first information generation unit 8 repeatedly generates the first light distribution pattern information PTN1 based on the image IMG. The storage unit 10 stores a plurality of items of first light distribution pattern information PTN1. The pattern determination unit 12 uses the plurality of items of first light distribution pattern information PTN1 to determine the light distribution pattern PTN that should be formed. The lamp control unit 14 controls the variable light distribution lamp 2 to form the light distribution pattern PTN thus determined. A detailed description will be given of the operation of each part.

FIGS. 2A-2L, FIGS. 3A-3L, and FIGS. 4A-4P are schematic diagrams showing the flow of control executed by the light distribution control device 6. FIG. 2A, FIG. 2E, FIG. 2I, FIG. 3A, FIG. 3E, FIG. 3I, FIG. 4A, FIG. 4E, FIG. 4I, and FIG. 4M show images IMG generated by the imaging device 4. FIG. 2B, FIG. 2F, FIG. 2J, FIG. 3B, FIG. 3F, FIG. 3J, FIG. 4B, FIG. 4F, FIG. 4J, and FIG. 4N show the first light distribution pattern information PTN1 generated by the first information generation unit 8. FIG. 2C, FIG. 2G, FIG. 2K, FIG. 3C, FIG. 3G, FIG. 3K, FIG. 4C, FIG. 4G, FIG. 4K, and FIG. 4O show the first light distribution pattern information PTN1 stored in the storage unit 10. FIG. 2D, FIG. 2H, FIG. 2L, FIG. 3D, FIG. 3H, FIG. 3L, FIG. 4D, FIG. 4H, FIG. 4L, and FIG. 4P show the light distribution pattern PTN determined by the lamp control unit 14. In the following description, it is assumed that the position of the light spot 16 does not change.

The first information generation unit 8 acquires the image IMG from the imaging device 4 repeatedly and generates the first light distribution pattern information PTN1 repeatedly based on the each image IMG. When each image IMG includes the predetermined light spot 16, the first information generation unit 8 generates the first light distribution pattern information PTN1 having the light shielding part 18 determined by the light spot 16. Meanwhile, when each image IMG does not include the light spot 16, the first information generation unit 8 generates the first light distribution pattern information PTN1 that does not include the light shielding part 18.

In this embodiment, the light spot 16 for which the light shielding part 18 is formed originates from the lamp of a vehicle in front. The lamp of a vehicle in front is inclusive of the rear lamp of a leading vehicle and the headlamp of an oncoming vehicle. Further, the rear lamp is inclusive of a stop lamp and a tail lamp. The first information generation unit 8 can extract the light spot 16 originating from the lamp of the vehicle in front and determine the light shielding part 18 by applying a publicly known image processing to the image IMG. The light shielding part 18 overlaps the vehicle in front when the light distribution pattern PTN is formed. This reduces the glare experienced by the driver of the vehicle in front.

For example, the first information generation unit 8 applies a binarization process to each pixel in the image IMG by using a predetermined threshold value related to the brightness value or chromatic value. This makes it possible to extract the light spot 16 in the image IMG originating from the vehicle in front. Further, the first information generation unit 8 applies an expansion process and a contraction process to the binarized image by using a predetermined structural element. This converts the pixel value of a pixel located around a pixel overlapping the light spot 16 into the pixel value of a pixel overlapping the light spot 16. The first information generation unit 8 defines the range of pixels having that pixel value or the range derived from adding a predetermined margin to the range to be the range of the light shielding part 18. Subsequently, the first information generation unit 8 applies a brightness inversion process to, for example, an image subjected to the expansion and contraction process. The resultant image information represents the first light distribution pattern information PTN1 having the light shielding part 18.

In the first light distribution pattern information PTN1, the illuminance value of the light shielding part 18 (the brightness value of the pixel overlapping the light shielding part 18) is lower than the illuminance value of the other parts. "Light shielding" is inclusive of a case where the illuminance of light irradiating the target part is configured to be completely zero and a case where the illuminance of that part is reduced to a +zero value. The method of determining the light shielding part 18 is not limited to the one described above. Given an interval a between a pair of light spots 16 originating from the lamp of a vehicle in front, for example, a range b in the height direction may be predefined, and a range accommodated in the range of a (horizontal)×b (vertical) may be defined to be the light shielding part 18.

Figure 2:
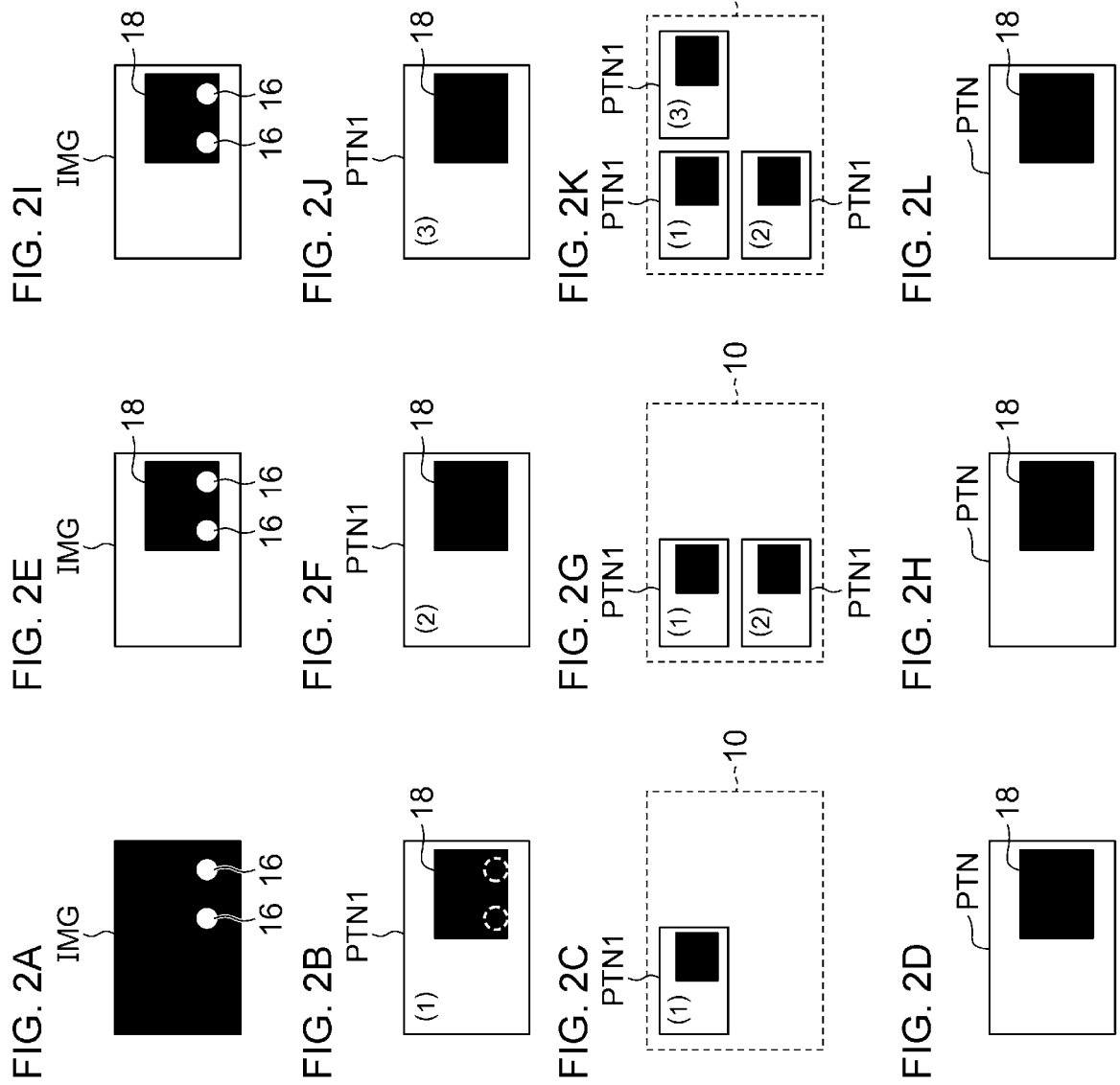
FIGS. 2A-2L are schematic diagrams showing the flow of control executed by the light distribution control device.

It is assumed, by way of one example, that a pair of light spots 16 originating from the lamp of the vehicle in front are included in the image IMG. In this case, as shown in FIG. 2B, the first information generation unit 8 generates the first light distribution pattern information PTN1 having the light shielding part 18. The first information generation unit 8 sends the first light distribution pattern information PTN1 thus generated to the storage unit 10. This causes, as shown in FIG. 2C, the first light distribution pattern information PTN1 to be stored in the storage unit 10. Then, as shown in FIG. 2D, the pattern determination unit 12 determines the light distribution pattern PTN that should be formed, based on the first light distribution pattern information PTN1 stored in the storage unit 10.

In the state shown in FIG. 2C, only one item of first light distribution pattern information PTN1 is stored in the storage unit 10. Therefore, the pattern determination unit 12 determines the first light distribution pattern information PTN1 itself to be light distribution pattern PTN that should be formed. The pattern determination unit 12 sends the information indicating the light distribution pattern PTN thus determined to the lamp control unit 14. The lamp control unit 14 controls the variable light distribution lamp 2 to radiate the visible light beam L1 having an intensity distribution determined by the determined light distribution pattern PTN. This causes, as shown in FIG. 2E, the light distribution pattern PTN having the light shielding part 18 overlapping the vehicle in front to be formed in front of the driver's vehicle. The imaging device 4 then forms the image IMG indicating the situation in front of the driver's vehicle in which the light distribution pattern PTN is formed.

The image IMG shown in FIG. 2E includes the light spot 16. Therefore, as shown in FIG. 2F, the first information generation unit 8 generates the first light distribution pattern information PTN1 having the light shielding part 18 and sends the first light distribution pattern information PTN1 to the storage unit 10. This causes, as shown in FIG. 2G, the 2nd first light distribution pattern information PTN1 to be stored in the storage unit 10. Then, as shown in FIG. 2H, the pattern determination unit 12 determines the light distribution pattern PTN that should be formed, based on the two items of first light distribution pattern information PTN1 stored in the storage unit 10, and sends the light distribution pattern PTN to the lamp control unit 14. This results, as shown in FIG. 2I, in the light distribution pattern PTN having the light shielding part 18 being formed in front of the driver's vehicle. The imaging device 4 then forms the image IMG.

When determining the light distribution pattern PTN based on a plurality of items of first light distribution pattern information PTN1, the pattern determination unit 12 synthesizes the plurality of items of first light distribution pattern information PTN1 in an OR operation and determines the light distribution pattern PTN that should be formed, based on the result of synthesis. When any of the first light distribution pattern information PTN1 stored in the storage unit 10 has the light shielding part 18, therefore, the determined light distribution pattern PTN will have the light shielding part 18. The light shielding part 18 that the determined light distribution pattern PTN has will have a shape in which the light shielding parts 18 that the respective items of first light distribution pattern information PTN1 stored in the storage unit 10 have are synthesized.

Figure 3:
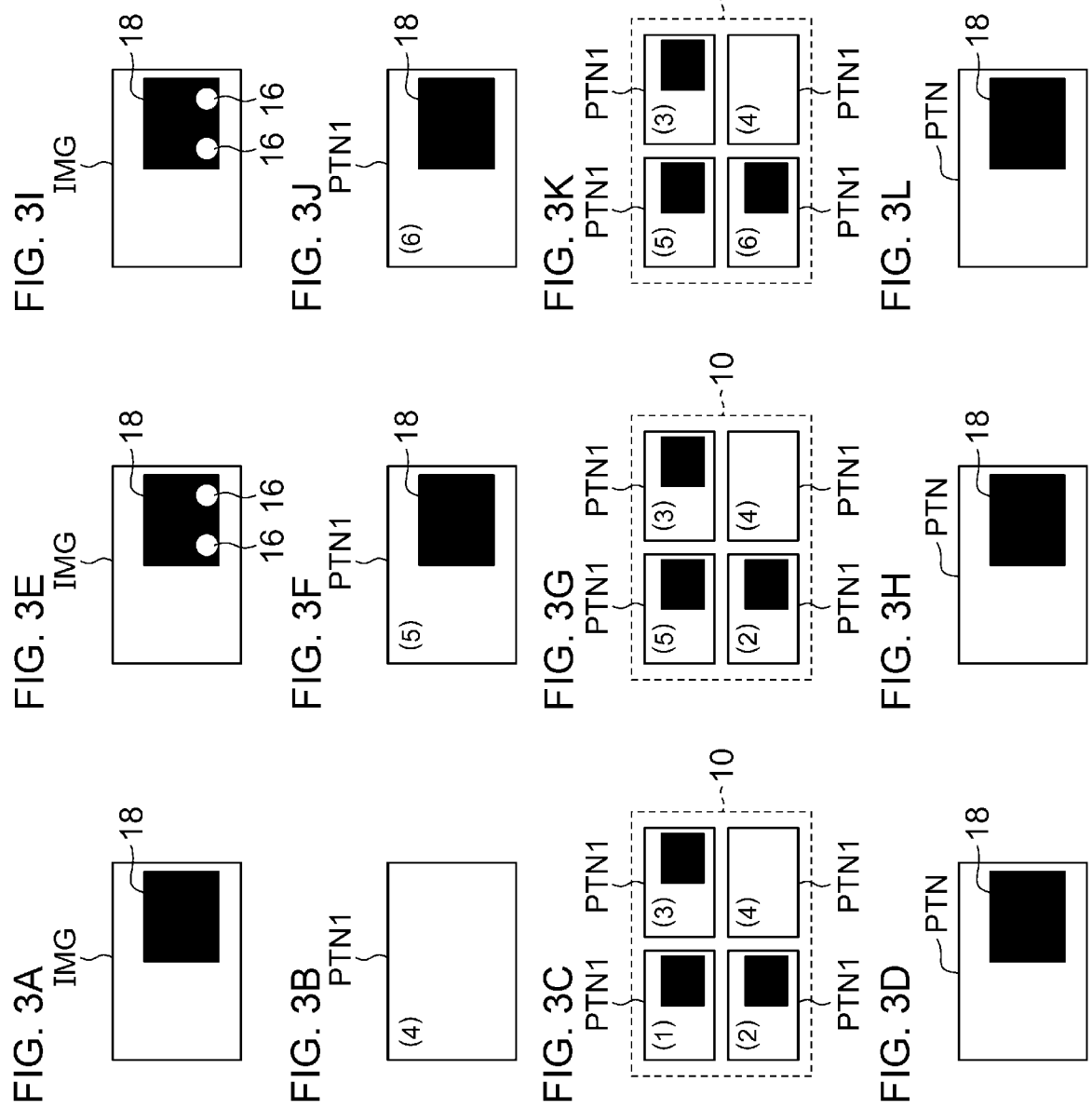
FIGS. 3A-3L are schematic diagrams showing the flow of control executed by the light distribution control device.

The image IMG shown in FIG. 2I includes the light spot 16. Therefore, as shown in FIG. 2J, the first information generation unit 8 generates the first light distribution pattern information PTN1 having the light shielding part 18 and sends the first light distribution pattern information PTN1 to the storage unit 10. This causes, as shown in FIG. 2K, the 3rd first light distribution pattern information PTN1 to be stored in the storage unit 10. Then, as shown in FIG. 2L, the pattern determination unit 12 determines the light distribution pattern PTN that should be formed, based on the three items of first light distribution pattern information PTN1 stored in the storage unit 10, and sends the light distribution pattern PTN to the lamp control unit 14. This results, as shown in FIG. 3A, in the light distribution pattern PTN having the light shielding part 18 being formed in front of the driver's vehicle. The imaging device 4 then forms the image IMG.

The image IMG shown in FIG. 3A does not include the light spot 16. Therefore, as shown in FIG. 3B, the first information generation unit 8 generates the first light distribution pattern information PTN1 not having the light shielding part 18 and sends the first light distribution pattern information PTN1 to the storage unit 10. This causes, as shown in FIG. 3C, in the 4th first light distribution pattern information PTN1 to be stored in the storage unit 10. Then, as shown in FIG. 3D, the pattern determination unit 12 determines the light distribution pattern PTN that should be formed, based on the four items of first light distribution pattern information PTN1 stored in the storage unit 10, and sends the light distribution pattern PTN to the lamp control unit 14. This results, as shown in FIG. 3E, in the light distribution pattern PTN having the light shielding part 18 being formed in front of the driver's vehicle. The imaging device 4 then forms the image IMG.

As described above, the pattern determination unit 12 synthesizes a plurality of items of first light distribution pattern information PTN1 in an OR operation to determine the light distribution pattern PTN that should be formed. Therefore, the 4th first light distribution pattern information PTN 1 does not have the light shielding part 18, but the existent three items of first light distribution pattern information PTN1 have the light shielding part 18 so that the determined light distribution pattern PTN will have the light shielding part 18.

The image IMG shown in FIG. 3E includes the light spot 16. Therefore, as shown in FIG. 3F, the first information generation unit 8 generates the first light distribution pattern information PTN1 having the light shielding part 18 and sends the first light distribution pattern information PTN1 to the storage unit 10. This causes, as shown in FIG. 3G, in the 5th first light distribution pattern information PTN1 to be stored in the storage unit 10. In this embodiment, the maximum number of items of first light distribution pattern information PTN1 stored in the storage unit 10 is defined to be four for the purpose of description. Therefore, the 5th first light distribution pattern information PTN1 is replaced by the 1st first light distribution pattern information PTN1. In actual control, it is expected that 100 or more items of first light distribution pattern information PTN1 are stored in the storage unit 10 and used for determination of the light distribution pattern PTN.

Then, as shown in FIG. 3H, the pattern determination unit 12 determines the light distribution pattern PTN that should be formed, based on the four items of first light distribution pattern information PTN1 stored in the storage unit 10, and sends the light distribution pattern PTN to the lamp control unit 14. This results, as shown in FIG. 3I, in the light distribution pattern PTN having the light shielding part 18 being formed in front of the driver's vehicle. The imaging device 4 then forms the image IMG.

Figure 4:
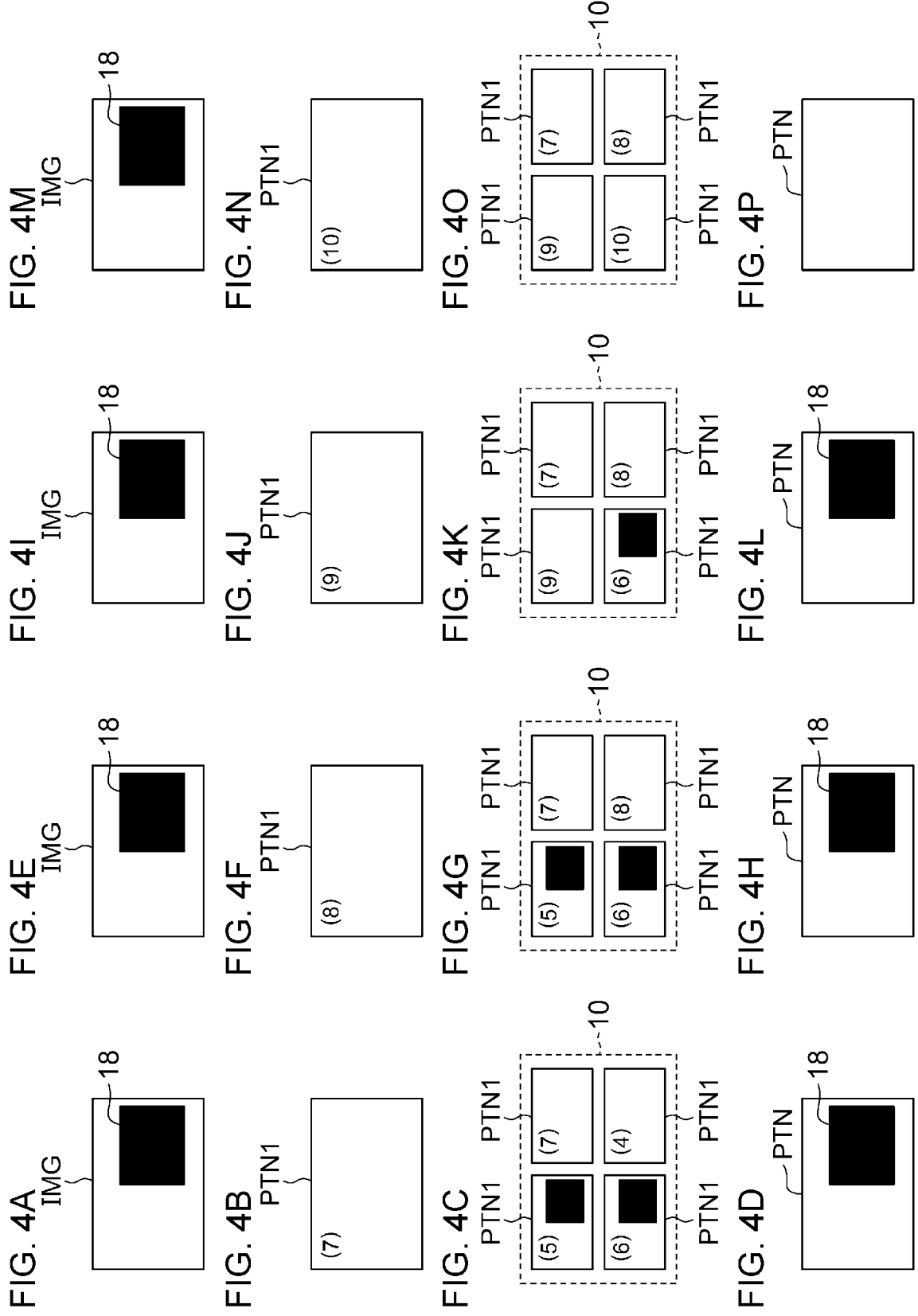
FIGS. 4A-4P are schematic diagrams showing the flow of control executed by the light distribution control device.

The image IMG shown in FIG. 3I includes the light spot 16. Therefore, as shown in FIG. 3J, the first information generation unit 8 generates the first light distribution pattern information PTN1 having the light shielding part 18 and sends the first light distribution pattern information PTN1 to the storage unit 10. This results, as shown in FIG. 3K, in the 2nd first light distribution pattern information PTN1 being replaced by the 6th first light distribution pattern information PTN1. Then, as shown in FIG. 3L, the pattern determination unit 12 determines the light distribution pattern PTN that should be formed, based on the four items of first light distribution pattern information PTN1 stored in the storage unit 10, and sends the light distribution pattern PTN to the lamp control unit 14. This results, as shown in FIG. 4A, in the light distribution pattern PTN having the light shielding part 18 being formed in front of the driver's vehicle. The imaging device 4 then forms the image IMG.

The image IMG shown in FIG. 4A does not include the light spot 16. Therefore, as shown in FIG. 4B, the first information generation unit 8 generates the first light distribution pattern information PTN1 not having the light shielding part 18 and sends the first light distribution pattern information PTN1 to the storage unit 10. This results, as shown in FIG. 4C, in the 3rd first light distribution pattern information PTN1 being replaced by the 7th first light distribution pattern information PTN1. Then, as shown in FIG. 4D, the pattern determination unit 12 determines the light distribution pattern PTN that should be formed, based on the four items of first light distribution pattern information PTN1 stored in the storage unit 10, and sends the light distribution pattern PTN to the lamp control unit 14. This results, as shown in FIG. 4E, in the light distribution pattern PTN having the light shielding part 18 being formed in front of the driver's vehicle. The imaging device 4 then forms the image IMG.

The image IMG shown in FIG. 4E does not include the light spot 16. Therefore, as shown in FIG. 4F, the first information generation unit 8 generates the first light distribution pattern information PTN1 not having the light shielding part 18 and sends the first light distribution pattern information PTN1 to the storage unit 10. This results, as shown in FIG. 4G, in the 4th first light distribution pattern information PTN1 being replaced by the 8th first light distribution pattern information PTN1. Then, as shown in FIG. 4H, the pattern determination unit 12 determines the light distribution pattern PTN that should be formed, based on the four items of first light distribution pattern information PTN1 stored in the storage unit 10, and sends the light distribution pattern PTN to the lamp control unit 14. This results, as shown in FIG. 4I, in the light distribution pattern PTN having the light shielding part 18 being formed in front of the driver's vehicle. The imaging device 4 then forms the image IMG.

The image IMG shown in FIG. 4I does not include the light spot 16. Therefore, as shown in FIG. 4J, the first information generation unit 8 generates the first light distribution pattern information PTN1 not having the light shielding part 18 and sends the first light distribution pattern information PTN1 to the storage unit 10. This results, as shown in FIG. 4K, in the 5th first light distribution pattern information PTN1 being replaced by the 9th first light distribution pattern information PTN1. Then, as shown in FIG. 4L, the pattern determination unit 12 determines the light distribution pattern PTN that should be formed, based on the four items of first light distribution pattern information PTN1 stored in the storage unit 10, and sends the light distribution pattern PTN to the lamp control unit 14. This results, as shown in FIG. 4M, in the light distribution pattern PTN having the light shielding part 18 being formed in front of the driver's vehicle. The imaging device 4 then forms the image IMG.

The image IMG shown in FIG. 4M does not include the light spot 16. Therefore, as shown in FIG. 4N, the first information generation unit 8 generates the first light distribution pattern information PTN1 not having the light shielding part 18 and sends the first light distribution pattern information PTN1 to the storage unit 10. This results, as shown in FIG. 4O, in the 6th first light distribution pattern information PTN1 being replaced by the 10th first light distribution pattern information PTN1. Then, as shown in FIG. 4P, the pattern determination unit 12 determines the light distribution pattern PTN that should be formed, based on the four items of first light distribution pattern information PTN1 stored in the storage unit 10, and sends the light distribution pattern PTN to the lamp control unit 14. The storage unit 10 stores only the first light distribution pattern information PTN1 not having the light shielding part 18. Therefore, the determined light distribution pattern PTN will be the light distribution pattern PTN not having the light shielding part 18.

In the image IMG shown in FIG. 3A, the light spot 16 is not detected, but the light spot 16 is detected in the image IMG shown in FIG. 3E obtained at the next point of time of imaging. In other words, the light spot 16 is not detected momentarily at the point of time shown in FIG. 3A. Meanwhile, the pattern determination unit 12 determines the light distribution pattern PTN that should be formed, based on the plurality of items of first light distribution pattern information PTN1 stored in the storage unit 10. Therefore, as shown in FIG. 3E, formation of the light distribution pattern PTN having the light shielding part 18 is continued even if the light spot 16 is not detected momentarily.

Further, the light distribution pattern PTN not having the light shielding part 18 as shown in FIG. 4P is determined, when the light spot 16 is not detected in the image IMG for a predetermined period of time continuously as shown in FIG. 4A, FIG. 4E, FIG. 4I, and FIG. 4M and when none of the items of first light distribution pattern information PTN1 stored in the storage unit 10 has the light shielding part 18.

If the light distribution pattern PTN not having the light shielding part 18 is formed in response to momentary non-detection of the light spot 16, the light distribution pattern PTN not having the light shielding part 18 could momentarily switch to the light distribution pattern PTN having the light shielding part 18. When the brightness or color of the light spot 16 is near the detection threshold value, for example, detection of the light spot 16 could frequently switch to non-detection of the light spot 16 or vice versa. In another scenario, when the lamp of the vehicle in front is flashing at a high speed for light modulation, etc., detection of the light spot 16 could frequently switch to non-detection of the light spot 16 or vice versa, depending on how the flashing period of the lamp and the imaging period of the imaging device 4 overlap. When such a situation is created, momentary switching between formation and non-formation of the light shielding part 18 will be repeated, which produces flickering of the light shielding part 18. This flickering could lower the visibility for the driver of the driver's vehicle.

Meanwhile, the status of formation of the light shielding part 18 can be stabilized by allowing for the past first light distribution pattern information PTN1 stored in the storage unit 10 in determination of the light distribution pattern PTN. This can avoid flickering of the light shielding part 18 and increase the visibility for the driver. The time required for disappearance of the light shielding part 18 can be adjusted by adjusting the number of items of first light distribution pattern information PTN1 used for determination of the light distribution pattern PTN, i.e., the number of items of first light distribution pattern information PTN1 stored in the storage unit 10.

Figure 5:
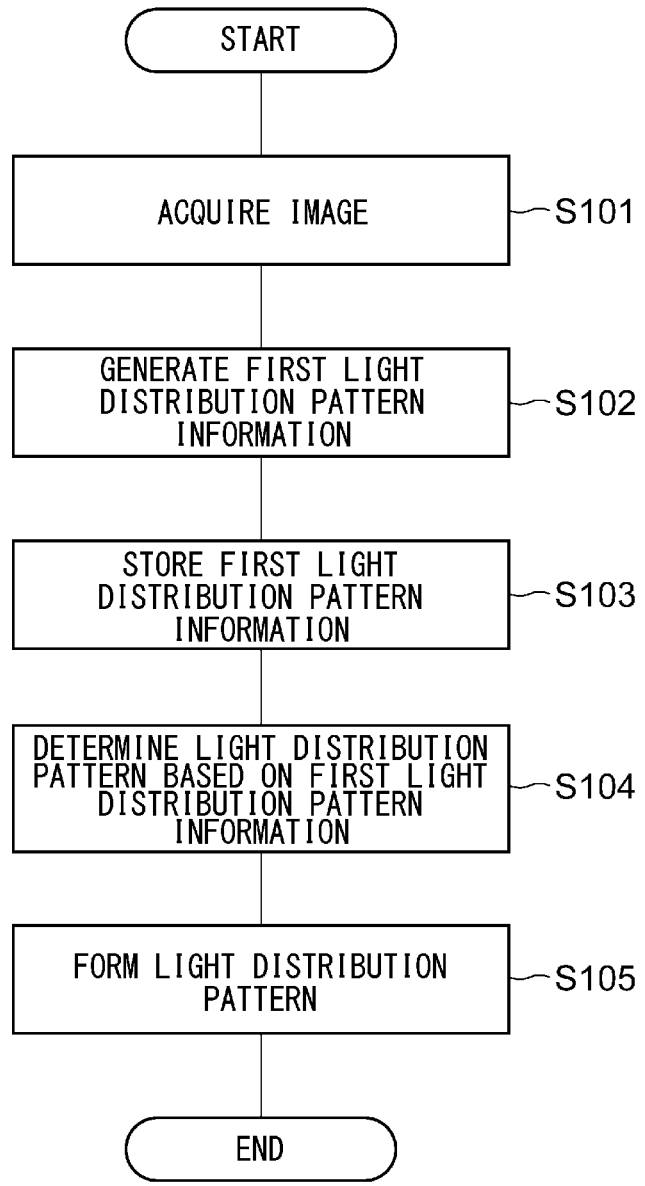
FIG. 5 is a flowchart showing an example of light distribution control executed by the light distribution control device.

FIG. 5 is a flowchart showing an example of light distribution control executed by the light distribution control device 6. The flow is executed repeatedly at predetermined points of time, for example, when the light distribution control device 6 is instructed to execute the light distribution control via a light switch (not shown) and when the ignition is on.

First, the light distribution control device 6 acquires the image IMG (S101). Subsequently, the light distribution control device 6 generates the first light distribution pattern information PTN1 based on the image IMG (S102). The light distribution control device 6 then stores the first light distribution pattern information PTN1 thus generated in the storage unit 10 (S103). Subsequently, the light distribution control device 6 determines the light distribution pattern PTN that should be formed, based on the first light distribution pattern information PTN1 stored in the storage unit 10 (S104). Subsequently, the light distribution control device 6 controls the variable light distribution lamp 2 to form the light distribution pattern PTN thus determined (S105) and terminates the route.

As described above, the light distribution control device 6 according to the embodiment controls the variable light distribution lamp 2 to form the light distribution pattern PTN determined by the plurality of items of first light distribution pattern information PTN1 based on the respective images IMG. By way of one example, the light distribution control device 6 includes the first information generation unit 8, the pattern determination unit 12, and the lamp control unit 14. The first information generation unit 8 repeatedly acquires the image IMG from the imaging device 4 and repeatedly generates the first light distribution pattern information PTN1 including the light shielding part 18 when the image IMG includes the predetermined light spot 16 and not including the light shielding part 18 when the image IMG does not include the light spot 16. The pattern determination unit 12 determines the light distribution pattern PTN that should be formed by using the plurality of items of first light distribution pattern information PTN1. The lamp control unit 14 controls the variable light distribution lamp 2 to form the light distribution pattern PTN thus determined.

Thus, flickering of the light shielding part 18 can be suppressed by using the plurality of items of first light distribution pattern information PTN1 to determine the light distribution pattern PTN that should be formed, i.e., by including the first light distribution pattern information PTN1 generated in the past into the factor in determination of the light distribution pattern PTN. As a result, a drop in the visibility for the driver of the driver's vehicle can be suppressed. Further, flickering of the light shielding part 18 as viewed from the side of the diver of the vehicle in front will appear as high-speed switching between irradiation and non-irradiation with light. Therefore, suppressing flickering of the light shielding part 18 also suppresses a drop in the visibility for the driver of the vehicle in front.

Further, the light distribution control device 6 of the embodiment is provided with the storage unit 10 for storing the plurality of items of first light distribution pattern information PTN1, and the pattern determination unit 12 determines the light distribution pattern PTN based on the plurality of items of first light distribution pattern information PTN1 stored in the storage unit 10. Further, the pattern determination unit 12 synthesizes the plurality of items of first light distribution pattern information PTN1 in an OR operation and determines the light distribution pattern PTN based on the result of synthesis. This can further suppress flickering of the light shielding part 18 with simple control.

The pattern determination unit 12 of this embodiment determines the light distribution pattern PTN based only on the first light distribution pattern information PTN1 stored in the storage unit 10, but the embodiment is non-limiting as to the feature. For example, the pattern determination unit 12 may determine the light distribution pattern PTN based on the first light distribution pattern information PTN1 just generated by the first information generation unit 8 and not stored in the storage unit 10 and the first light distribution pattern information PTN1 stored in the storage unit 10.

Embodiment 2

The vehicular lamp system 1 and the light distribution control device 6 according to embodiment 2 have a configuration common to that of embodiment 1 except for the detail of light distribution control. A description will be given of this embodiment, highlighting the configuration different from that of embodiment 1. A description of common features will be simplified or omitted.

Figure 6:
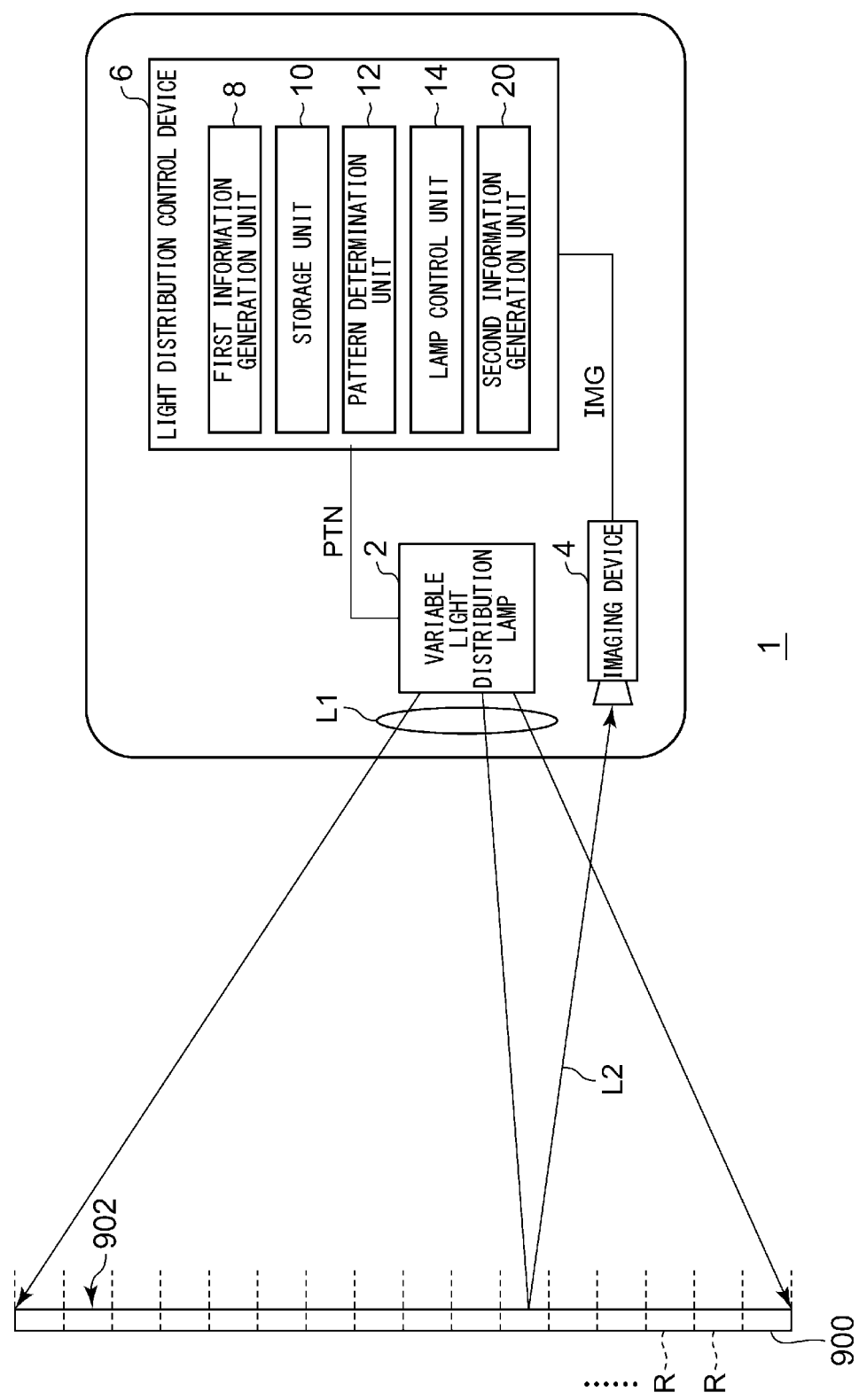
FIG. 6 is a block diagram of the vehicular lamp system according to embodiment 2.

FIG. 6 is a block diagram of the vehicular lamp system according to embodiment 2. FIG. 6 depicts some of the elements constituting the vehicular lamp system 1 as functional blocks. The light distribution control device 6 controls the variable light distribution lamp 2 to form the light distribution pattern PTN determined by the plurality of items of first light distribution pattern information PTN1 based on the respective images IMG. The vehicular lamp system 1 includes, by way of one example, the variable light distribution lamp 2, the imaging device 4, and the light distribution control device 6. The light distribution control device 6 includes the first information generation unit 8, the storage unit 10, the pattern determination unit 12, the lamp control unit 14, and a second information generation unit 20. A detailed description will be given of the operation of each part.

FIGS. 7A-7L, FIGS. 8A-8L, and FIGS. 9A-9H are schematic diagrams showing the flow of control executed by the light distribution control device 6. FIG. 7A, FIG. 7E, FIG. 7I, FIG. 8A, FIG. 8E, FIG. 8I, FIG. 9A and FIG. 9E show images IMG generated by the imaging device 4. FIG. 7B, FIG. 7F, FIG. 7J, FIG. 8B, FIG. 8F, FIG. 8J, FIG. 9B, and FIG. 9F show the first light distribution pattern information PTN1 generated by the first information generation unit 8. FIG. 7C, FIG. 7G, FIG. 7K, FIG. 8C, FIG. 8G, FIG. 8K, FIG. 9C, and FIG. 9G show the second light distribution pattern information PTN2 stored in the storage unit 10. FIG. 7D, FIG. 7H, FIG. 7L, FIG. 8D, FIG. 8H, FIG. 8L, FIG. 9D, and FIG. 9H show the light distribution pattern PTN determined by the lamp control unit 14. In the following description, it is assumed that the position of the light spot 16 does not change.

The first information generation unit 8 repeatedly generates the first light distribution pattern information PTN1 based on the image IMG acquired from the imaging device 4. It is assumed, by way of one example, that a pair of light spots 16 originating from the lamp of the vehicle in front are included in the image IMG as shown in FIG. 7A. In this case, as shown in FIG. 7B, the first information generation unit 8 generates the first light distribution pattern information PTN1 having the light shielding part 18. Hereinafter, the illuminance value of the light shielding part 18 that the first light distribution pattern information PTN1 has will be referred to as normal illuminance value as necessary, and the light shielding part 18 having the normal illuminance value will be referred to as a light shielding part 18x as necessary. The first information generation unit 8 sends the first light distribution pattern information PTN1 to the pattern determination unit 12.

Like the pattern determination unit 12 of embodiment 1, the pattern determination unit 12 determines the light distribution pattern PTN that should be formed by using a plurality of items of first light distribution pattern information PTN1. However, embodiment 2 differs from embodiment 1 in the following aspects. In other words, the pattern determination unit 12 of embodiment 1 uses the plurality of items of first light distribution pattern information PTN1 themselves, i.e., uses the plurality of items of first light distribution pattern information PTN1 directly, to determine the light distribution pattern PTN that should be formed. In contrast, the pattern determination unit 12 of this embodiment indirectly uses some of the plurality of items of first light distribution pattern information PTN1 to determine the light distribution pattern PTN that should be formed.

More specifically, the pattern determination unit 12 determines the light distribution pattern PTN based on the second light distribution pattern information PTN2 obtained by applying a predetermined image processing to a light distribution pattern PTN determined in the past, in addition to the first light distribution pattern information PTN1 itself. In other words, the pattern determination unit 12 uses, along with the first light distribution pattern information PTN1, the second light distribution pattern information PTN2 generated from the light distribution pattern PTN determined at the first point of time when determining the new light distribution pattern PTN at the second point of time after the first point of time. The light distribution pattern PTN is determined in no small measure based on the first light distribution pattern information PTN1 so that the use of the second light distribution pattern information PTN2 based on the light distribution pattern PTN represents indirect use of the first light distribution pattern information PTN1. The second light distribution pattern information PTN2 is stored in the storage unit 10 as described later.

In the state shown in FIG. 7C, the second light distribution pattern information PTN2 is not stored in the storage unit 10. Therefore, as shown in FIG. 7D, the pattern determination unit 12 determines the first light distribution pattern information PTN1 itself to be light distribution pattern PTN that should be formed. The pattern determination unit 12 sends the information indicating the light distribution pattern PTN thus determined to the lamp control unit 14. This causes, as shown in FIG. 7E, the light distribution pattern PTN having the light shielding part 18x with the normal illuminance value to be formed in front of the driver's vehicle. The imaging device 4 then forms the image IMG indicating the situation in front of the driver's vehicle in which the light distribution pattern PTN is formed.

Further, the pattern determination unit 12 sends the information indicating the determined light distribution pattern PTN to the second information generation unit 20. The second information generation unit 20 generates the second light distribution pattern information PTN2 by increasing the illuminance value of the light shielding part 18 that the light distribution pattern PTN (corresponding to the light distribution pattern PTN determined at the first point of time) determined by the pattern determination unit 12 has by a predetermined amount. In the generation of the second light distribution pattern information PTN2, the illuminance value of the light shielding part 18 may be increased by uniformly increasing the pixel values in the entirety of the image information corresponding to the light distribution pattern PTN (the illuminance value of the entirety of the light distribution pattern PTN) by a predetermined amount.

In this embodiment, four stages, ranging from the illuminance of the light shielding part 18x with the normal illuminance value to the illuminance that occurs when the light shielding part 18 disappears, are provided for the purpose of description. When the normal illuminance value is increased through the four stages, therefore, the light shielding part 18 will disappear. The second information generation unit 20 sends the second light distribution pattern information PTN2 thus generated to the storage unit 10. This causes, as shown in FIG. 7G, the second light distribution pattern information PTN2 having a light shielding part 18a with an illuminance value one step higher to be stored in the storage unit 10.

The image IMG shown in FIG. 7E does not include the light spot 16. Therefore, as shown in FIG. 7F, the first information generation unit 8 generates the first light distribution pattern information PTN1 not having the light shielding part 18 and sends the first light distribution pattern information PTN1 to the pattern determination unit 12. Then, as shown in FIG. 7H, the pattern determination unit 12 determines the light distribution pattern PTN that should be formed (corresponding to determination of the light distribution pattern PTN at the second point of time), based on the first light distribution pattern information PTN1 received from the first information generation unit 8 and the second light distribution pattern information PTN2 stored in the storage unit 10 and sends the light distribution pattern PTN to the lamp control unit 14.

The pattern determination unit 12 synthesizes the first light distribution pattern information PTN1 and the second light distribution pattern information PTN2 in an OR operation and determines the light distribution pattern PTN that should be formed, based on the result of synthesis. Since the first light distribution pattern information PTN1 does not have the light shielding part 18 but the second light distribution pattern information PTN2 has the light shielding part 18a with an illuminance value one step higher, therefore, the determined light distribution pattern PTN will have the light shielding part 18a with an illuminance value one step higher. This causes, as shown in FIG. 7I, the light distribution pattern PTN having the light shielding part 18a with an illuminance value one step higher to be formed in front of the driver's vehicle. The imaging device 4 then forms the image IMG.

Further, the pattern determination unit 12 sends the information indicating the determined light distribution pattern PTN to the second information generation unit 20. The second information generation unit 20 generates the second light distribution pattern information PTN2 from the determined light distribution pattern PTN and sends the second light distribution pattern information PTN2 to the storage unit 10. This causes, as shown in FIG. 7K, the second light distribution pattern information PTN2 having a light shielding part 18b with an illuminance value two steps higher to be stored in the storage unit 10. In this embodiment, only one item of second light distribution pattern information PTN2 is stored in the storage unit 10. Therefore, the existent second light distribution pattern information PTN2 is overwritten by the new second light distribution pattern information PTN2.

The image IMG shown in FIG. 7I includes the light spot 16. Therefore, as shown in FIG. 7J, the first information generation unit 8 generates the first light distribution pattern information PTN1 having the light shielding part 18x with the normal illuminance value and sends the first light distribution pattern information PTN1 to the pattern determination unit 12. Then, as shown in FIG. 7L, the pattern determination unit 12 determines the light distribution pattern PTN that should be formed, based on the first light distribution pattern information PTN1 received from the first information generation unit 8 and the second light distribution pattern information PTN2 stored in the storage unit 10 and sends the light distribution pattern PTN to the lamp control unit 14.

The first light distribution pattern information PTN1 has the light shielding part 18x with the normal illuminance value, and the second light distribution pattern information PTN2 has the light shielding part 18b with an illuminance value two steps higher. Therefore, the determined light distribution pattern PTN will be the light distribution pattern PTN having the light shielding part 18 of a shape derived from synthesizing the light shielding part 18x of the first light distribution pattern information PTN1 and the light shielding part 18b of the second light distribution pattern information PTN2. The OR operation causes the illuminance value of a part where the light shielding part 18x and the light shielding part 18b overlap to be the illuminance value of the light shielding part 18x (the lower illuminance value). This causes, as shown in FIG. 8A, the light distribution pattern PTN having the light shielding part 18x with the normal illuminance value to be formed in front of the driver's vehicle. The imaging device 4 then forms the image IMG.

Further, the pattern determination unit 12 sends the information indicating the determined light distribution pattern PTN to the second information generation unit 20. The second information generation unit 20 generates the second light distribution pattern information PTN2 from the determined light distribution pattern PTN and sends the second light distribution pattern information PTN2 to the storage unit 10. This causes, as shown in FIG. 8C, the second light distribution pattern information PTN2 having the light shielding part 18a with an illuminance value one step higher to be stored in the storage unit 10.

The image IMG shown in FIG. 8A includes the light spot 16. Therefore, as shown in FIG. 8B, the first information generation unit 8 generates the first light distribution pattern information PTN1 having the light shielding part 18x with the normal illuminance value and sends the first light distribution pattern information PTN1 to the pattern determination unit 12. Then, as shown in FIG. 8D, the pattern determination unit 12 determines the light distribution pattern PTN that should be formed, based on the first light distribution pattern information PTN1 received from the first information generation unit 8 and the second light distribution pattern information PTN2 stored in the storage unit 10 and sends the light distribution pattern PTN to the lamp control unit 14. The first light distribution pattern information PTN1 has the light shielding part 18$x$ with the normal illuminance value, and the second light distribution pattern information PTN2 has the light shielding part 18$a$ with an illuminance value one step higher. This causes, as shown in FIG. 8E, the light distribution pattern PTN having the light shielding part 18$x$ with the normal illuminance value to be formed in front of the driver's vehicle. The imaging device 4 then forms the image IMG.

Further, the pattern determination unit 12 sends the information indicating the determined light distribution pattern PTN to the second information generation unit 20. The second information generation unit 20 generates the second light distribution pattern information PTN2 from the determined light distribution pattern PTN and sends the second light distribution pattern information PTN2 to the storage unit 10. This causes, as shown in FIG. 8G, the second light distribution pattern information PTN2 having the light shielding part 18$a$ with an illuminance value one step higher to be stored in the storage unit 10.

The image IMG shown in FIG. 8E does not include the light spot 16. Therefore, as shown in FIG. 8F, the first information generation unit 8 generates the first light distribution pattern information PTN1 not having the light shielding part 18 and sends the first light distribution pattern information PTN1 to the pattern determination unit 12. Then, as shown in FIG. 8H, the pattern determination unit 12 determines the light distribution pattern PTN that should be formed, based on the first light distribution pattern information PTN1 received from the first information generation unit 8 and the second light distribution pattern information PTN2 stored in the storage unit 10 and sends the light distribution pattern PTN to the lamp control unit 14. The first light distribution pattern information PTN1 does not have the light shielding part 18, and the second light distribution pattern information PTN2 has the light shielding part 18$a$ with an illuminance value one step higher. This causes, as shown in FIG. 8I, the light distribution pattern PTN having the light shielding part 18$a$ with an illuminance value one step higher to be formed in front of the driver's vehicle. The imaging device 4 then forms the image IMG.

Further, the pattern determination unit 12 sends the information indicating the determined light distribution pattern PTN to the second information generation unit 20. The second information generation unit 20 generates the second light distribution pattern information PTN2 from the determined light distribution pattern PTN and sends the second light distribution pattern information PTN2 to the storage unit 10. This causes, as shown in FIG. 8K, the second light distribution pattern information PTN2 having the light shielding part 18$b$ with an illuminance value two steps higher to be stored in the storage unit 10.

The image IMG shown in FIG. 8I does not include the light spot 16. Therefore, as shown in FIG. 8J, the first information generation unit 8 generates the first light distribution pattern information PTN1 not having the light shielding part 18 and sends the first light distribution pattern information PTN1 to the pattern determination unit 12. Then, as shown in FIG. 8L, the pattern determination unit 12 determines the light distribution pattern PTN that should be formed, based on the first light distribution pattern information PTN1 received from the first information generation unit 8 and the second light distribution pattern information PTN2 stored in the storage unit 10 and sends the light distribution pattern PTN to the lamp control unit 14. The first light distribution pattern information PTN1 does not have the light shielding part 18, and the second light distribution pattern information PTN2 has the light shielding part 18$b$ with an illuminance value two steps higher. This causes, as shown in FIG. 9A, the light distribution pattern PTN having the light shielding part 18$b$ with an illuminance value two steps higher to be formed in front of the driver's vehicle. The imaging device 4 then forms the image IMG.

Further, the pattern determination unit 12 sends the information indicating the determined light distribution pattern PTN to the second information generation unit 20. The second information generation unit 20 generates the second light distribution pattern information PTN2 from the determined light distribution pattern PTN and sends the second light distribution pattern information PTN2 to the storage unit 10. This causes, as shown in FIG. 9C, the second light distribution pattern information PTN2 having a light shielding part 18$c$ with an illuminance value three steps higher to be stored in the storage unit 10.

The image IMG shown in FIG. 9A does not include the light spot 16. Therefore, as shown in FIG. 9B, the first information generation unit 8 generates the first light distribution pattern information PTN1 not having the light shielding part 18 and sends the first light distribution pattern information PTN1 to the pattern determination unit 12. Then, as shown in FIG. 9D, the pattern determination unit 12 determines the light distribution pattern PTN that should be formed, based on the first light distribution pattern information PTN1 received from the first information generation unit 8 and the second light distribution pattern information PTN2 stored in the storage unit 10 and sends the light distribution pattern PTN to the lamp control unit 14. The first light distribution pattern information PTN1 does not have the light shielding part 18, and the second light distribution pattern information PTN2 has the light shielding part 18$c$ with an illuminance value three steps higher. This causes, as shown in FIG. 9E, the light distribution pattern PTN having the light shielding part 18$c$ with an illuminance value three steps higher to be formed in front of the driver's vehicle. The imaging device 4 then forms the image IMG.

Further, the pattern determination unit 12 sends the information indicating the determined light distribution pattern PTN to the second information generation unit 20. The second information generation unit 20 generates the second light distribution pattern information PTN2 from the determined light distribution pattern PTN and sends the second light distribution pattern information PTN2 to the storage unit 10. This causes, as shown in FIG. 9G, the second light distribution pattern information PTN2 not having the light shielding part 18 to be stored in the storage unit 10.

The image IMG shown in FIG. 9E does not include the light spot 16. Therefore, as shown in FIG. 9F, the first information generation unit 8 generates the first light distribution pattern information PTN1 not having the light shielding part 18 and sends the first light distribution pattern information PTN1 to the pattern determination unit 12. Then, as shown in FIG. 9H, the pattern determination unit 12 determines the light distribution pattern PTN that should be formed, based on the first light distribution pattern information PTN1 received from the first information generation unit 8 and the second light distribution pattern information PTN2 stored in the storage unit 10 and sends the light distribution pattern PTN to the lamp control unit 14. Neither the first light distribution pattern information PTN1 nor the second light distribution pattern information PTN2 has the light shielding part 18. Therefore, the determined light distribution pattern PTN will be the light distribution pattern PTN not having the light shielding part 18.

In the image IMG shown in FIG. 7E, the light spot 16 is not detected, but the light spot 16 is detected in the image IMG shown in FIG. 7I obtained at the next point of time of imaging. In other words, the light spot 16 is not detected momentarily at the point of time shown in FIG. 7E. Meanwhile, the pattern determination unit 12 determines the light distribution pattern PTN that should be formed, based on the first light distribution pattern information PTN1 generated based on the image IMG shown in FIG. 7E and the second light distribution pattern information PTN2 stored in the storage unit 10. Therefore, as shown in FIG. 7I, the light distribution pattern PTN having the light shielding part 18a one step brighter is formed even if the light spot 16 is not detected momentarily.

Further, the light distribution pattern PTN not having the light shielding part 18 as shown in FIG. 9H is determined, when the light spot 16 is not detected in the image IMG for a predetermined period of time continuously as shown in FIG. 8E, FIG. 8I, FIG. 9A, FIG. 9E and when the light shielding part 18 disappears from the second light distribution pattern information PTN2.

If the light distribution pattern PTN not having the light shielding part 18 is formed in response to momentary non-detection of the light spot 16, the light distribution pattern PTN not having the light shielding part 18 could momentarily switch to the light distribution pattern having the light shielding part 18. When such a situation is created, flickering of the light shielding part 18 is created, which could lower the visibility for the driver of the driver's vehicle. Meanwhile, the status of formation of the light shielding part 18 can be stabilized by allowing for the second light distribution pattern information PTN2 derived from the past light distribution pattern PTN in determination of the light distribution pattern PTN. This can avoid flickering of the light shielding part 18 and suppress a drop in the visibility for the driver. The time required for disappearance of the light shielding part 18 can be adjusted by adjusting the amount of increase in the illuminance value when the second light distribution pattern information PTN2 is generated.

In embodiment 1, the plurality of items of first light distribution pattern information PTN1 are stored in the storage unit 10, and all of the items of first light distribution pattern information PTN1 are subject to an OR operation. For this reason, the volume of information stored and the volume of computation tend to increase, and the load imposed on the light distribution control device 6 tends to increase. In contrast, this embodiment requires storing one item of second light distribution pattern information PTN2 in the storage unit 10 and requires an OR operation only once. Accordingly, the load imposed on the light distribution control device 6 can be reduced.

Figure 10:
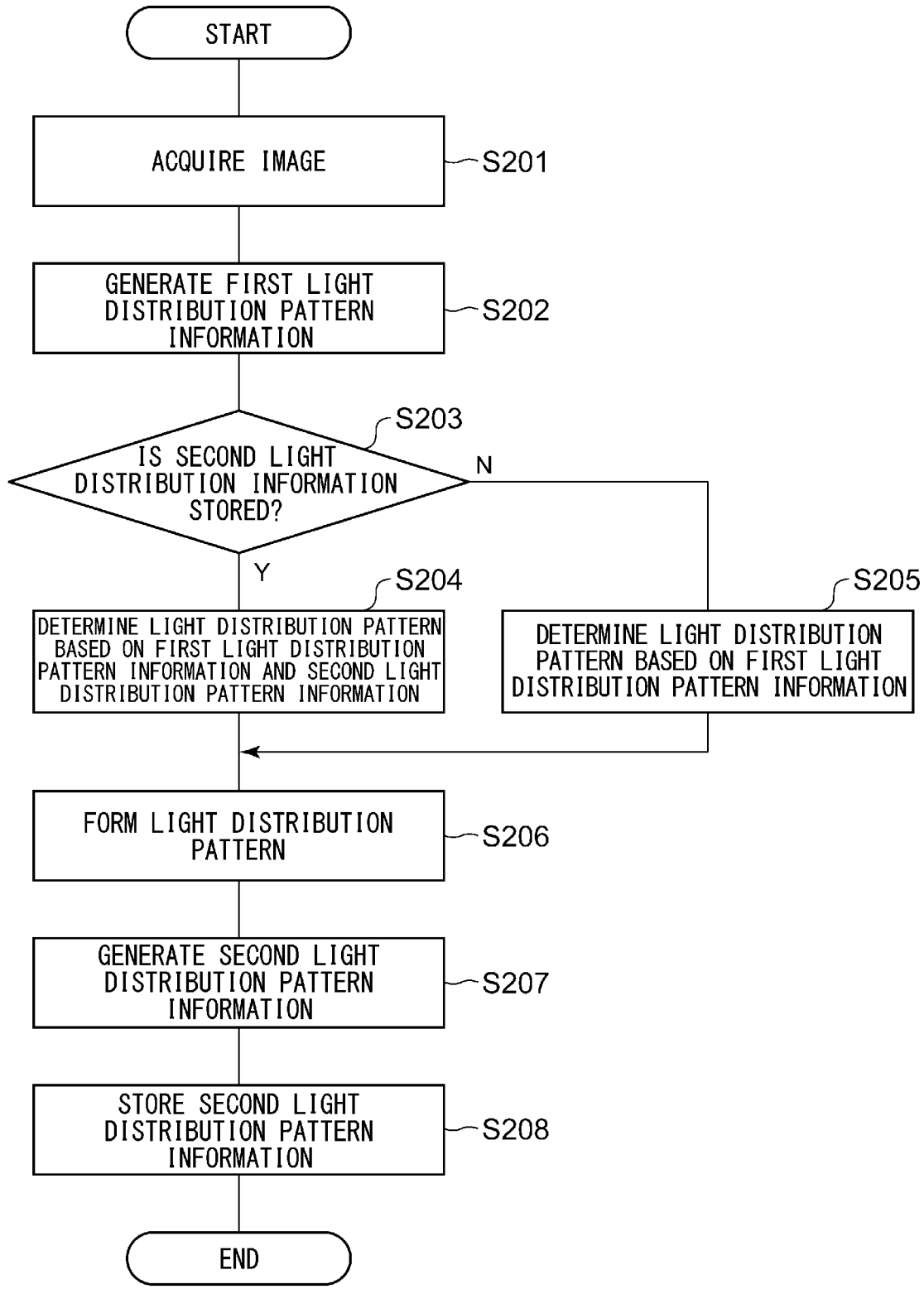
FIG. 10 is a flowchart showing an example of light distribution control executed by the light distribution control device.

FIG. 10 is a flowchart showing an example of light distribution control executed by the light distribution control device 6. The flow is executed repeatedly at predetermined points of time, for example, when the light distribution control device 6 is instructed to execute the light distribution control via a light switch (not shown) and when the ignition is on.

First, the light distribution control device 6 acquires the image IMG (S201). Subsequently, the light distribution control device 6 generates the first light distribution pattern information PTN1 based on the image IMG (S202). The light distribution control device 6 then determines whether the second light distribution pattern information PTN2 is stored in the storage unit 10 (S203). When the second light distribution pattern information PTN2 is stored (Y in S203), the light distribution control device 6 determines the light distribution pattern PTN that should be formed, based on the first light distribution pattern information PTN1 and the second light distribution pattern information PTN2 (S204).

When the second light distribution pattern information PTN2 is not stored (N in S203), the light distribution control device 6 determines the light distribution pattern PTN that should be formed, based on the first light distribution pattern information PTN1 (S205). Subsequently, the light distribution control device 6 controls the variable light distribution lamp 2 to form the light distribution pattern PTN thus determined (S206). Subsequently, the light distribution control device 6 generates the second light distribution pattern information PTN2 based on the determined light distribution pattern PTN (S207). The light distribution control device 6 then stores the second light distribution pattern information PTN2 thus generated in the storage unit 10 (S208) and terminates the routine.

The light distribution control device 6 according to this embodiment can also suppress flickering of the light shielding part 18. As a result, a drop in the visibility for the driver of the driver's vehicle can be suppressed. Further, suppressing flickering of the light shielding part 18 also suppresses a drop in the visibility for the driver of the vehicle in front. Further, the load imposed on the light distribution control device 6 can be reduced as compared with embodiment 1.

In this embodiment, the brightness value in the image information corresponding to the light distribution pattern PTN that should be formed may be subject to a binarization process, and the pixel values of the pixels corresponding to the light shielding part 18a—the light shielding part 18c may be converted into pixel values corresponding to the normal illuminance value of the light shielding part 18x. When the light distribution pattern PTN includes the light shielding part 18a—the light shielding part 18c, therefore, this can convert the light shielding part 18a—the light shielding part 18c into the light shielding part 18x with the normal illuminance value. As a result, the light shielding part 18x can be caused to overlap the vehicle in front at the timing, for example, shown in FIG. 7I so that the glare experienced by the driver of the vehicle in front can be reduced further.

Embodiments of the present disclosure are described above in detail. The embodiments described above are merely specific examples of practicing the present disclosure. The details of the embodiments shall not be construed as limiting the technical scope of the present disclosure. A number of design modifications such as change, addition, deletion, etc. of constituting elements may be made to the extent that they do not depart from the idea of the disclosure defined by the claims. New embodiments with design modifications will provide the combined advantages of the embodiment and the variation. Although the details subject to such design modification are emphasized in the embodiments by using phrases such as "of this embodiment" and "in this embodiment", details not referred to as such are also subject to design modification. Any combination of constituting elements included described above is also useful as an embodiment of the present disclosure. Hatching in the cross section in the drawings should not be construed as limiting the material of the hatched object.

(Variation 1)

The vehicular lamp system 1 according to embodiment 2 may be configured as variation 1 described below. In other words, the illuminance value of the entirety of the light shielding part 18 is uniformly increased when the second light distribution pattern information PTN2 is generated in embodiment 2. In this variation, on the other hand, the light shielding part 18 is divided into a plurality of parts, and the illuminance values of the respective parts are increased by different amounts of increase. This causes the time elapsed until the light shielding part 18 disappears to differ depending on the location. The other aspects of this variation are common to those of embodiment 2. A description of the common features will be omitted as appropriate.

FIGS. 11A-11F are schematic diagrams showing the flow of control executed by the light distribution control device 6 in the vehicular lamp system 1 according to variation 1. FIGS. 11A-11F show a case in which the illuminance of the light distribution pattern PTN is defined in 8 bits (256 levels). For example, it is assumed that the pattern determination unit 12 determines the light distribution pattern PTN shown in FIG. 11A based on the image IMG including the light spot 16 and that the light distribution pattern PTN is formed in front of the driver's vehicle. The light distribution pattern PTN has the light shielding part 18x with the normal illuminance value. When the second information generation unit 20 receives the determined light distribution pattern PTN from the pattern determination unit 12, the second information generation unit 20 increases the illuminance value of the light shielding part 18x by a predetermined value to generate the second light distribution pattern information PTN2. The second information generation unit 20 of this variation divides the light shielding part 18x into a first part 22 and second parts 24 different from the first part 22.

By way of one example, the first part 22 includes the central part of the light shielding part 18 in the vehicle width direction. The second parts 24 include the ends of the light shielding part 18 in the vehicle width direction. The first part 22 is sandwiched by the two second parts 24 in the vehicle width direction. The second information generation unit 20 maintains information on the first part 22 and the second parts 24 in advance. The information on the first part 22 and the second parts 24 includes the angular range of the respective parts in the vehicle width direction. The angular range is given by, for example, the proportion occupied by each of the first part 22 and the second parts 24 with respect to the entirety of the light shielding part 18. The position and range of the first part 22 and the second parts 24 can be set as appropriate based on experiments or simulation conducted by the designer.

The second information generation unit 20 increases the illuminance value of the first part 22 by a level smaller than the illuminance value of the second parts 24. The amount of increase in the illuminance value of the first part 22 and the amount of increase in the illuminance value of the second parts 24 can be set as appropriate based on experiments or simulation conducted by the designer. In this variation, the illuminance value of the first part 22 is incremented in units of 51, and the illuminance value of the second parts 24 is incremented in units of 64, by way of one example. In this way, the second light distribution pattern information PTN2 having the light shielding part 18a is obtained, as shown in FIG. 11B. The second information generation unit 20 stores the second light distribution pattern information PTN2 thus obtained in the storage unit 10. In the light shielding part 18x, the illuminance value of the first part 22 and the second parts 24 is 0. In the light shielding part 18a, on the other hand, the illuminance of the first part 22 is increased to 51, and the illuminance value of the second parts 24 is increased to 64, respectively.

Figure 11A:
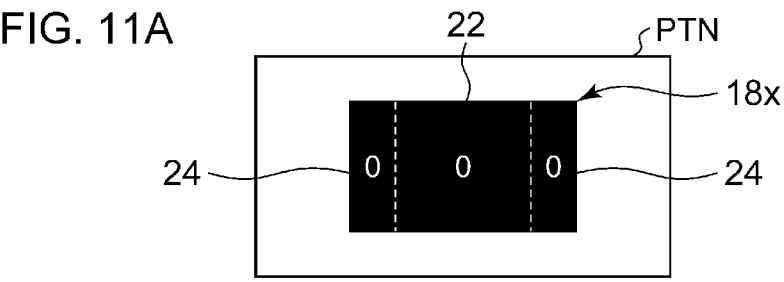
FIGS. 11A-11F are schematic diagrams showing the flow of control executed by the light distribution control device in the vehicular lamp system according to variation 1.
Figure 11B:
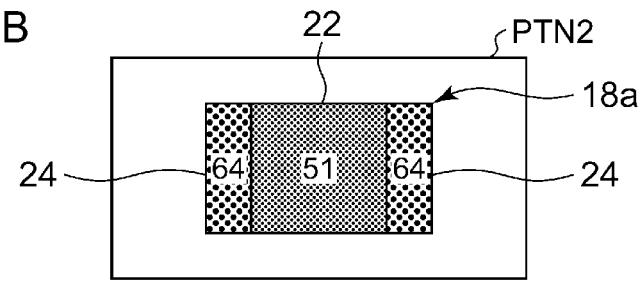
Figure 11C:
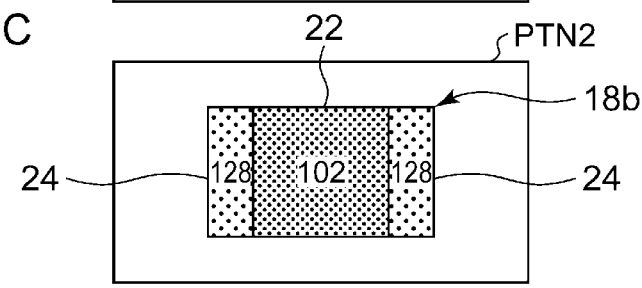

It is assumed that the state in which the light spot 16 is not included in the image IMG continues since the formation of the light distribution pattern PTN shown in FIG. 11A. In this case, the pattern determination unit 12 determines the light distribution pattern PTN having the light shielding part 18a to be light distribution pattern PTN formed in front of the driver's vehicle. When the second information generation unit 20 receives the information on the determined light distribution pattern PTN from the pattern determination unit 12, the second information generation unit 12 generates the second light distribution pattern information PTN2 by increasing the illuminance value of the light shielding part 18a by a predetermined amount. In this way, the second light distribution pattern information PTN2 having the light shielding part 18b is obtained, as shown in FIG. 11C. In the light shielding part 18b, the illuminance value of the first part 22 is increased to 102, and the illuminance value of the second parts 24 is increased to 128, respectively.

Figure 11D:
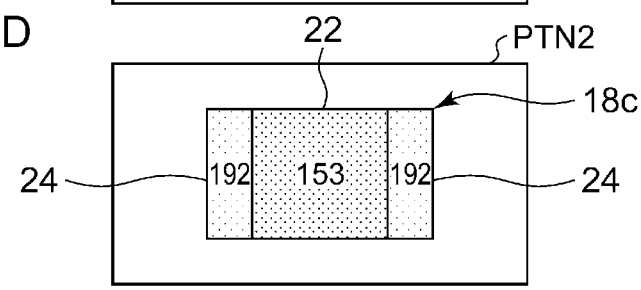

Subsequently, the pattern determination unit 12 determines the light distribution pattern PTN having the light shielding part 18b to be light distribution pattern PTN formed in front of the driver's vehicle. When the second information generation unit 20 receives the information on the determined light distribution pattern PTN from the pattern determination unit 12, the second information generation unit 12 generates the second light distribution pattern information PTN2 by increasing the illuminance value of the light shielding part 18b by a predetermined amount. In this way, the second light distribution pattern information PTN2 having the light shielding part 18c is obtained, as shown in FIG. 11D. In the light shielding part 18c, the illuminance value of the first part 22 is increased to 153, and the illuminance value of the second parts 24 is increased to 192, respectively.

Figure 11E:
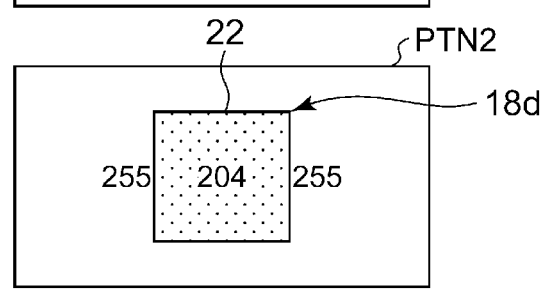

Subsequently, the pattern determination unit 12 determines the light distribution pattern PTN having the light shielding part 18c to be light distribution pattern PTN formed in front of the driver's vehicle. When the second information generation unit 20 receives the information on the determined light distribution pattern PTN from the pattern determination unit 12, the second information generation unit 12 generates the second light distribution pattern information PTN2 by increasing the illuminance value of the light shielding part 18c by a predetermined amount. In this way, the second light distribution pattern information PTN2 having the light shielding part 18d is obtained, as shown in FIG. 11E. In the light shielding part 18d, the illuminance value of the first part 22 is increased to 204, and the illuminance value of the second parts 24 is increased to 255, respectively. Therefore, the light shielding part 18d is comprised only of the first part 22.

Figure 11F:
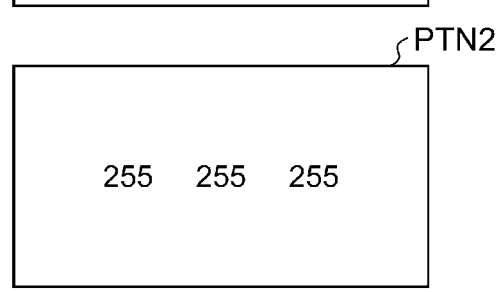

Subsequently, the pattern determination unit 12 determines the light distribution pattern PTN having the light shielding part 18d to be light distribution pattern PTN formed in front of the driver's vehicle. When the second information generation unit 20 receives the information on the determined light distribution pattern PTN from the pattern determination unit 12, the second information generation unit 12 generates the second light distribution pattern information PTN2 by increasing the illuminance value of the light shielding part 18d by a predetermined amount. In this way, the second light distribution pattern information PTN2 not having the light shielding part 18 is obtained, as shown in FIG. 11F.

According to the control of this embodiment, the first part 22 of the light shielding part 18 can be caused to remain for a longer period of time than the second parts 24. For example, it is highly likely that the vehicle in front is located at the center of the light shielding part 18. By delaying the disappearance of the first part 22 located at the center of the light shielding part 18, therefore, the glare experienced by the driver of the vehicle in front can be reduced further. The difference between embodiment 2 and this variation is whether the illuminance value of the entirety of the light shielding part 18 is increased uniformly or the light shielding part 18 is divided into a plurality of parts and the illuminance value is increased by different amounts of increase. Therefore, this variation can be implemented without accompanying a large change associated with the load imposed on the light distribution control device 6 or the amount of memory used.

(Variation 2)

The vehicular lamp system 1 according to embodiment 1 may be configured as variation 2 described below. In embodiment 1, the first light distribution pattern information PTN1 is stored in the storage unit 10 as it is. In this variation, on the other hand, the first light distribution pattern information PTN1 is reduced before being stored in the storage unit 10. This can save the memory consumption and reduce the memory capacity required in the storage unit 10. The other aspects of this variation are common to those of embodiment 2. A description of the common features will be omitted as appropriate.

Figure 12A:
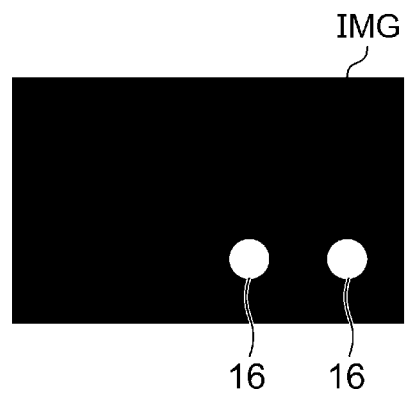
FIGS. 12A-12D are schematic diagrams showing the flow of control executed by the light distribution control device in the vehicular lamp system according to variation 2.
Figure 12B:
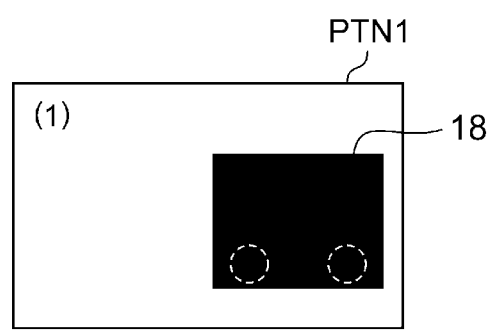

FIGS. 12A-12D are schematic diagrams showing the flow of control executed by the light distribution control device 6 in the vehicular lamp system according to variation 2. It is assumed, for example, that a pair of light spots 16 are included in the image IMG as shown in FIG. 12A. In this case, as shown in FIG. 12B, the first information generation unit 8 generates the first light distribution pattern information PTN1 having the light shielding part 18. As described above, the first light distribution pattern information PTN1 is image information obtained by applying an image process such as a binarization process to the image IMG. Therefore, the first light distribution pattern information PTN1 is comprised of a plurality of pixel groups arranged in the first direction. Each pixel group has a linear shape extending in the second direction orthogonal to the first direction. Each pixel group is comprised of a plurality of pixels continuous in the second direction. In this variation, the first direction is the perpendicular direction (vertical direction) and the second direction is the vehicle width direction (horizontal direction).

Figure 12C:
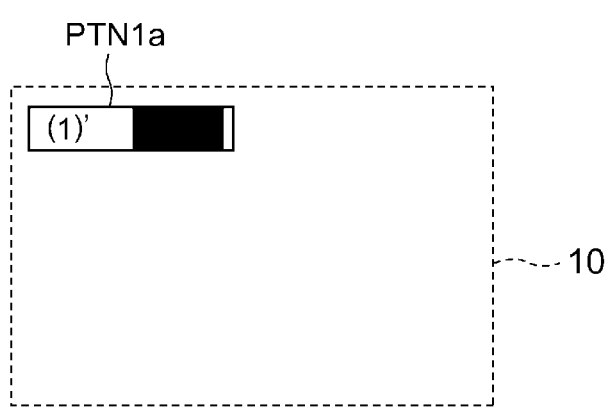

The first information generation unit 8 causes the plurality of pixel groups to overlap each other to generate the first reduced information PTN1a derived from reducing the first light distribution pattern information PTN1 in the first direction. The first information generation unit 8 sends the first reduced information PTN 1a thus generated to the storage unit 10. The storage unit 10 stores, as shown in FIG. 12C, the first reduced information PTN1a. Thus, the memory consumption of the storage unit 10 can be saved by reducing the first light distribution pattern information PTN1 to one line before storage in the storage unit 10. The number of pixels in each pixel group in the first direction may be set as appropriate based on experiments or simulation conducted by the designer.

Figure 12D:
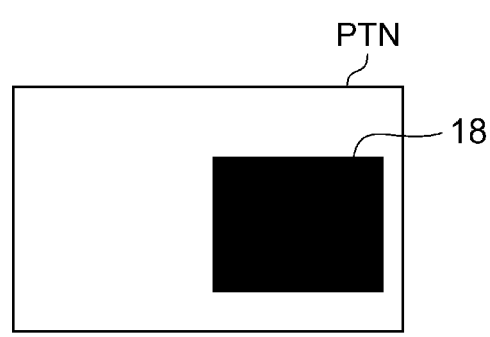

Then, as shown in FIG. 12D, the pattern determination unit 12 determines the light distribution pattern PTN that should be formed, based on the first reduced information PTN1a stored in the storage unit 10. When determining the light distribution pattern PTN, the pattern determination unit 12 stacks the first reduced information PTN1a stored in the storage unit 10 in the first direction to restore the first light distribution pattern information PTN1. The first light distribution pattern PTN is then determined based on the first light distribution pattern information PTN1 thus obtained.

When a plurality of items of first reduced information PTN1a are stored in the storage unit 10, each first reduced information PTN1a is returned to the first light distribution pattern information PTN1 and then the light distribution pattern PTN is determined based on the plurality of items of first light distribution pattern information PTN1 thus obtained. Alternatively, a plurality of items of first reduced information PTN1a are synthesized to produce one item of first reduced information PTN1a, and the first light distribution pattern information PTN1 is obtained from the first reduced information PTN1a resulting from the synthesis. The light distribution pattern PTN is determined based on this first light distribution pattern information PTN1.

In this variation, the positional information on the upper end of the light shielding part 18 in the first light distribution pattern information PTN1 and the positional information on the lower end thereof are stored in the storage unit 10 along with the first reduced information PTN1a. Therefore, the positions of the upper end and the lower end of the light shielding part 18 can be correctly reproduced when the first reduced information PTN1a is returned to the first light distribution pattern information PTN1. The positional information on the upper and lower ends of the light shielding part 18 may not be stored in the storage unit 10. In this case, the light distribution pattern PTN having the light shielding part 18 extending to the upper and lower ends of the light distribution pattern PTN is obtained.

(Variation 3)

The vehicular lamp system 1 according to embodiment 2 may be configured as variation 3 described below. In embodiment 2, the second light distribution pattern information PTN2 is stored in the storage unit 10 as it is. In this variation, on the other hand, the second light distribution pattern information PTN2 is reduced before being stored in the storage unit 10. This can save the memory consumption and reduce the memory capacity required in the storage unit 10. The other aspects of this variation are common to those of embodiment 2. A description of the common features will be omitted as appropriate.

FIGS. 13A-13L are schematic diagrams showing the flow of control executed by the light distribution control device 6 in the vehicular lamp system 1 according to variation 3. It is assumed, for example, that a pair of light spots 16 are included in the image IMG as shown in FIG. 13A. In this case, as shown in FIG. 13B, the first information generation unit 8 generates the first light distribution pattern information PTN1 having the light shielding part 18x with the normal illuminance value. The first information generation unit 8 sends the first light distribution pattern information PTN1 to the pattern determination unit 12.

In the state shown in FIG. 13C, the second reduced information PTN2a described later is not stored in the storage unit 10. Therefore, as shown in FIG. 13D, the pattern determination unit 12 determines the first light distribution pattern information PTN1 itself to be light distribution pattern PTN that should be formed. The pattern determination unit 12 sends the information indicating the light distribution pattern PTN thus determined to the lamp control unit 14. This results, as shown in FIG. 13E, in the light distribution pattern PTN having the light shielding part 18x with the normal illuminance value being formed in front of the driver's vehicle. The imaging device 4 then forms the image IMG.

Further, the pattern determination unit 12 sends the information indicating the determined light distribution pattern PTN to the second information generation unit 20. The second information generation unit 20 generates the second light distribution pattern information PTN2 having the light shielding part 18*a* by increasing the illuminance value of the light shielding part 18*x* that the determined light distribution pattern PTN has by a predetermined amount. In the generation of the second light distribution pattern information PTN2, the second information generation unit 20 may uniformly increase the illuminance value of the entirety of the light shielding part 18*x* as in embodiment 2. Alternatively, the second information generation unit 20 may divide the light shielding part 18*x* into a plurality of parts and increase the illuminance values of the respective parts by different amounts of increase as in variation 1.

The second light distribution pattern information PTN2 is image information obtained based on the image IMG. Therefore, the second light distribution pattern information PTN2 is comprised of a plurality of pixel groups arranged in the first direction. Each pixel group has a linear shape extending in the second direction orthogonal to the first direction. Each pixel group is comprised of a plurality of pixels continuous in the second direction. In this variation, the first direction is the perpendicular direction (vertical direction) and the second direction is the vehicle width direction (horizontal direction).

The second information generation unit 20 causes the plurality of pixel groups to overlap each other to generate the second reduced information PTN2*a* derived from reducing the second light distribution pattern information PTN2 in the first direction. The second information generation unit 20 sends the second reduced information PTN2*a* thus generated to the storage unit 10. The storage unit 10 stores, as shown in FIG. 13G, the second reduced information PTN2*a*. Thus, the memory consumption of the storage unit 10 can be saved by reducing the second light distribution pattern information PTN2 to one line before storage in the storage unit 10. The number of pixels in each pixel group in the first direction may be set as appropriate based on experiments or simulation conducted by the designer.

The image IMG shown in FIG. 13E does not include the light spot 16. Therefore, as shown in FIG. 13F, the first information generation unit 8 generates the first light distribution pattern information PTN1 not having the light shielding part 18 and sends the first light distribution pattern information PTN1 to the pattern determination unit 12. Meanwhile, as shown in FIG. 13H, the pattern determination unit 12 determines the light distribution pattern PTN that should be formed, based on the first light distribution pattern information PTN1 and the second reduced information PTN2*a* stored in the storage unit 10.

The pattern determination unit 12 synthesizes the plurality of pixel groups in the first light distribution pattern information PTN1 arranged in the first direction and the second reduced information PTN2*a* in an OR operation and determines the light distribution pattern PTN that should be formed, based on the result of synthesis. This causes, as shown in FIG. 13I, the light distribution pattern PTN having the light shielding part 18*a* to be formed in front of the driver's vehicle. The imaging device 4 then forms the image IMG.

In this variation, the positional information on the upper end of the light shielding part 18 and the positional information on the lower end of the light shielding part 18 in the second light distribution pattern information PTN2 are stored in the storage unit 10 along with the second reduced information PTN2*a*. Therefore, the positions of the upper end and the lower end of the light shielding part 18 can be correctly reproduced when the first light distribution pattern information PTN1 and the second reduced information PTN2*a* are synthesized. The positional information on the upper and lower ends of the light shielding part 18*a* may not be stored in the storage unit 10. In this case, the light distribution pattern PTN having the light shielding part 18*a* extending to the upper and lower ends of the light distribution pattern PTN is obtained.

Further, the pattern determination unit 12 sends the information indicating the determined light distribution pattern PTN to the second information generation unit 20. The second information generation unit 20 generates the second light distribution pattern information PTN2 from the determined light distribution pattern PTN. In this way, the second light distribution pattern information PTN2 having the light shielding part 18*b* is obtained. The second information generation unit 20 generates the second reduced information PTN2*a* derived from reducing the second light distribution pattern information PTN2 in the first direction. The storage unit 10 stores, as shown in FIG. 13K, the second reduced information PTN2*a* having the light shielding part 18*b*.

The image IMG shown in FIG. 13I includes the light spot 16. Therefore, as shown in FIG. 13J, the first information generation unit 8 generates the first light distribution pattern information PTN1 having the light shielding part 18*x* and sends the first light distribution pattern information PTN1 to the pattern determination unit 12. Then, as shown in FIG. 13L, the pattern determination unit 12 determines the light distribution pattern PTN that should be formed, based on the first light distribution pattern information PTN1 and the second reduced information PTN2*a* stored in the storage unit 10.

The image IMG shown in FIG. 13I includes only one light spot 16. Therefore, as shown in FIG. 13J, the first light distribution pattern information PTN1 has the light shielding part 18*x* narrower in the vehicle width direction than the light shielding part 18*b* that the second reduced information PTN2*a* has. Accordingly, the light distribution pattern information PTN obtained by synthesizing the first light distribution pattern information PTN1 and the second reduced information PTN2*a* has the light shielding part 18*b* and the light shielding part 18*x* arranged in the vehicle width direction.

The invention of the embodiments described above may be defined by the following items.

[Item 1]

A light distribution control method adapted to control, based on images (IMG) repeatedly obtained from an imaging device (4) that images an area in front of a vehicle, a variable light distribution lamp (2) capable of radiating a variable intensity distribution visible light beam (L1) to the area in front, wherein the light distribution control method controls the variable light distribution lamp (2) to form a light distribution pattern (PTN) determined by a plurality of items of first light distribution pattern information (PTN1) based on the respective images (IMG), the first light distribution pattern information (PTN1) including, when the image (IMG) includes a predetermined light spot (16), a light shielding part (18) determined based on the light spot (16) and not including a light shielding part (18) when the image does not include a light spot (16).

[Item 2]

The light distribution control method according to item 1, comprising:

repeatedly generating the first light distribution pattern information (PTN1);

determining the light distribution pattern (PTN) that should be formed by using the plurality of items of first light distribution pattern information (PTN1); and controlling the variable light distribution lamp (2) to form the determined light distribution pattern (PTN).

What is claimed is:

1. A light distribution control device for controlling, based on a plurality of images repeatedly obtained from an imaging device that images an area in front of a vehicle, a variable light distribution lamp for radiating a variable intensity distribution visible light beam to the area in front, comprising:
    a first information generation unit for repeatedly generating an item of first light distribution pattern information based on each image of the plurality of images, the first light distribution pattern information including, when the respective image includes a predetermined light spot, a light shielding part determined based on the light spot and not including a light shielding part when the respective image does not include the light spot;
    a storage unit for repeatedly storing a plurality of the items of first light distribution pattern information based on the plurality of images;
    a pattern determination unit for determining a light distribution pattern that should be formed based on the plurality of the items of first light distribution pattern information stored in the storage unit; and
    a lamp control unit for controlling the variable light distribution lamp to form the determined light distribution pattern.

2. The light distribution control device according to claim 1, wherein
    the pattern determination unit is configured to synthesize the plurality of the items of first light distribution pattern information in an OR operation and determine the light distribution pattern based on a result of synthesis.

3. The light distribution control device according to claim 2, wherein
    the first light distribution pattern information is comprised of a plurality of pixel groups arranged in a first direction, each pixel group of the plurality of pixel groups having a linear shape extending in a second direction orthogonal to the first direction,
    the first information generation unit is configured to cause the plurality of pixel groups to overlap each other to generate first reduced information derived from reducing the first light distribution pattern information in the first direction, and
    the storage unit stores is configured to store the first reduced information.

4. The light distribution control device according to claim 1, wherein
    the first light distribution pattern information is comprised of a plurality of pixel groups arranged in a first direction, each pixel group having a linear shape extending in a second direction orthogonal to the first direction,
    the first information generation unit is configured to cause the plurality of pixel groups to overlap each other to generate first reduced information derived from reducing the first light distribution pattern information in the first direction, and
    the storage unit is configured to store the first reduced information.

5. The light distribution control device according to claim 1, further comprising:
    a second information generation unit for generating second light distribution pattern information by increasing an illuminance value of the light shielding part that the light distribution pattern determined by the pattern determination unit at a first point of time has by a predetermined amount, wherein
    when determining a second light distribution pattern at a second point of time after the first point of time, the pattern determination unit is configured to determine the second light distribution pattern based on the first light distribution pattern information and the second light distribution pattern information.

6. The light distribution control device according to claim 5, wherein
    the pattern determination unit is configured to synthesize the first light distribution pattern information and the second light distribution pattern information in an OR operation and determines the second light distribution pattern based on a result of synthesis.

7. The light distribution control device according to claim 6, wherein
    the second information generation unit is configured to increase an illuminance value of a first part of the light shielding part by a level smaller than an illuminance value of a second part different from the first part.

8. The light distribution control device according to claim 7, wherein
    the second light distribution pattern information is comprised of a plurality of pixel groups arranged in a first direction, each pixel group of the plurality of pixel groups having a linear shape extending in a second direction orthogonal to the first direction,
    the second information generation unit is configured to cause the plurality of pixel groups to overlap each other to generate second reduced information derived from reducing the second light distribution pattern information in the first direction, and
    the storage unit is configured to store the second reduced information.

9. The light distribution control device according to claim 6, wherein
    the second light distribution pattern information is comprised of a plurality of pixel groups arranged in a first direction, each pixel group of the plurality of pixel groups having a linear shape extending in a second direction orthogonal to the first direction,
    the second information generation unit is configured to cause the plurality of pixel groups to overlap each other to generate second reduced information derived from reducing the second light distribution pattern information in the first direction, and
    the storage unit is configured to store the second reduced information.

10. The light distribution control device according to claim 5, wherein
    the second information generation unit is configured to increase an illuminance value of a first part of the light shielding part by a level smaller than an illuminance value of a second part different from the first part.

11. The light distribution control device according to claim 10, wherein
    the second light distribution pattern information is comprised of a plurality of pixel groups arranged in a first direction, each pixel group of the plurality of pixel groups having a linear shape extending in a second direction orthogonal to the first direction, the second information generation unit is configured to cause the plurality of pixel groups to overlap each other to generate second reduced information derived from reducing the second light distribution pattern information in the first direction, and the storage unit is configured to store the second reduced information.

12. The light distribution control device according to claim 5, wherein the second light distribution pattern information is comprised of a plurality of pixel groups arranged in a first direction, each pixel group of the plurality of pixel groups having a linear shape extending in a second direction orthogonal to the first direction, the second information generation unit is configured to cause the plurality of pixel groups to overlap each other to generate second reduced information derived from reducing the second light distribution pattern information in the first direction, and the storage unit is configured to store the second reduced information.

13. A vehicular lamp system comprising:

a variable light distribution lamp for radiating a variable intensity distribution visible light beam to an area in front of a vehicle;

an imaging device for imaging the area in front; and the light distribution control device according to claim 1.

14. A light distribution control method for controlling, based on a plurality of images repeatedly obtained from an imaging device that images an area in front of a vehicle, a variable light distribution lamp for radiating a variable intensity distribution visible light beam to the area in front, comprising:

repeatedly generating an item of first light distribution based on each respective image of the plurality of images, the first light distribution pattern information including, when the respective image includes a predetermined light spot, a light shielding part determined based on the light spot and not including a light shielding part when the respective image does not include the light spot;

repeatedly storing a plurality of the items of first light distribution pattern information based on the plurality of images;

determining a light distribution pattern that should be formed based on the plurality of the items of first light distribution pattern information stored in the storage unit; and controlling the variable light distribution lamp to form the determined light distribution pattern.

* * * * *